(12) United States Patent
Ayanam et al.

(10) Patent No.: US 9,311,486 B2
(45) Date of Patent: Apr. 12, 2016

(54) NETWORK BASED FIRMWARE FEATURE CONFIGURATION AND FIRMWARE IMAGE GENERATION

(71) Applicant: AMERICAN MEGATRENDS, INC., Norcross, GA (US)

(72) Inventors: Varadachari Sudan Ayanam, Suwanee, GA (US); Samvinesh Christopher, Suwanee, GA (US); Mohamed Fizer Khan Anverdeen, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 319 days.

(21) Appl. No.: 13/965,272

(22) Filed: Aug. 13, 2013

(65) Prior Publication Data

US 2015/0052596 A1 Feb. 19, 2015

(51) Int. Cl.
| G06F 9/44 | (2006.01) |
| G06F 21/57 | (2013.01) |
| H04W 4/00 | (2009.01) |
| H04L 29/08 | (2006.01) |
| H04L 29/06 | (2006.01) |
| G06F 9/45 | (2006.01) |
| G06F 9/445 | (2006.01) |

(52) U.S. Cl.
CPC .............. G06F 21/572 (2013.01); H04L 67/02 (2013.01); H04W 4/006 (2013.01); *G06F 8/44* (2013.01); *G06F 8/60* (2013.01); *H04L 63/083* (2013.01)

(58) Field of Classification Search
None
See application file for complete search history.

(56) References Cited

U.S. PATENT DOCUMENTS

| 7,237,086 B1 * | 6/2007 | Kothandapani ....... G06F 9/4443 703/21 |
| 7,673,290 B1 * | 3/2010 | Kothandapani ..... G06F 11/3006 717/121 |
| 2006/0080636 A1 * | 4/2006 | Hsieh ........................ G06F 8/51 717/101 |

* cited by examiner

*Primary Examiner* — Paul Yanchus, III
(74) *Attorney, Agent, or Firm* — Locke Lord LLP; Tim Tingkang Xia, Esq.

(57) ABSTRACT

A computer-implemented method for modeling a configuration of components connected directly or indirectly to a baseboard of a computer system includes: (a) defining a group of device description files at a network based firmware generator, each device description file describing a component in a set of components which is selectively included in the configuration, and each device description file specifies the identification information associated with the component to which the device description file is associated, (b) providing, at a remote computing device in communication with the firmware generator via a network, a graphical user interface configured to allow a user to visually generate a configuration instruction of baseboard firmware and send the configuration instruction to the firmware generator, and (c) constructing a firmware image at the firmware generator in accordance with the configuration instruction.

25 Claims, 16 Drawing Sheets

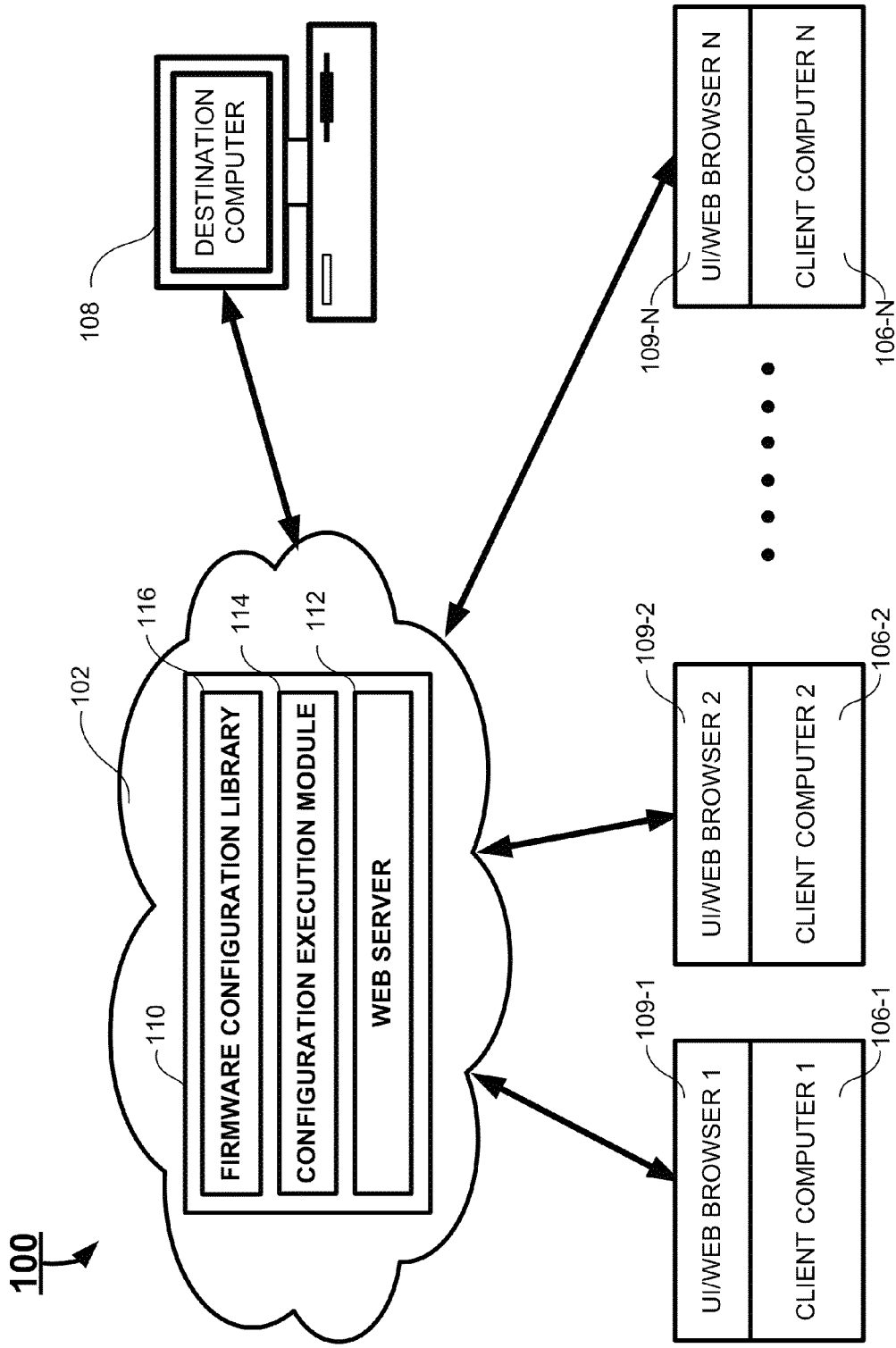

FIG. 2B

| SPX Package's Info - Total Packages : 278 | | |
|---|---|---|
| Package Name | Version | Last Update Date |
| @ARCH_ARM | 1.2.0 | Fri May 13 23:26:03 IST 2011 |
| @BASESOC_PILOT | 1.2.0 | Fri May 13 23:28:05 IST 2011 |
| @OEM_AMI | 1.2.0 | Sat May 14 00:51:07 IST 2011 |
| @PLATFORM_AVIATOR | 1.3.0 | Sat May 14 00:57:13 IST 2011 |
| @SOC_PILOT_II | 1.3.0 | Sat May 14 01:08:19 IST 2011 |
| Bootloader | 1.3.0 | Fri May 13 23:29:01 IST 2011 |
| Bootloader_Pristine | 1.2.0 | Fri May 13 23:32:48 IST 2011 |
| Bootloader_amiext | 1.13.0 | Wed May 25 04:15:16 IST 2011 |
| Bootloader_arch_arm | 1.4.0 | Fri May 13 23:30:20 IST 2011 |
| Bootloader_bugfix | 1.3.0 | Fri May 13 23:30:42 IST 2011 |
| Bootloader_cpu_arm926ejs | 1.3.0 | Fri May 13 23:30:53 IST 2011 |
| Bootloader_platform_aviator | 1.4.0 | Fri May 13 23:31:49 IST 2011 |
| Bootloader_soc_pilot_ii | 1.7.0 | Fri May 13 23:33:35 IST 2011 |
| CIMRepository_dev | 1.7.0 | Wed Jun 08 00:04:48 IST 2011 |
| Kernel | 1.3.0 | Thu Nov 11 01:59:10 IST 2010 |
| Kernel_Pristine | 1.2.0 | Sat May 14 00:07:05 IST 2011 |
| Kernel_amiext | 1.11.0 | Wed May 25 04:17:50 IST 2011 |
| Kernel_arch_arm | 1.3.0 | Sat May 14 00:03:46 IST 2011 |
| Kernel_bugfix | 1.6.0 | Wed May 18 02:44:04 IST 2011 |
| Kernel_cpu_arm926ejs | 1.3.0 | Sat May 14 00:04:36 IST 2011 |
| Kernel_platform_aviator | 1.3.0 | Sat May 14 00:05:39 IST 2011 |
| Kernel_soc_pilot_ii | 1.3.0 | Sat May 14 00:09:44 IST 2011 |

FIG. 2C

NETWORK BASED FIRMWARE FEATURE CONFIGURATION AND FIRMWARE IMAGE GENERATION

FIELD

The present disclosure generally relates to firmware image configuration, building and generation, and more particularly to network based tools for firmware feature configuration and firmware image generation.

BACKGROUND

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a microcontroller integrated into the baseboard (also known in the industry as the "motherboard") of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

The BMC must have knowledge of the types of sensors and devices connected to the contact pins of the BMC in order to correctly ascertain whether any events are occurring in the computer system. The BMC is typically integrated as a component on the baseboard of a computer system, and therefore, it is generally more efficient for baseboard designers to incorporate this knowledge into the BMC during design and manufacturing processes. Unfortunately, the specific layout, i.e., "configuration," of sensors and devices coupled to the contact pins of a BMC dramatically varies from one implementation to another. This variance is commonly based on the preferences of the customers requesting the design/manufacture of the baseboards. As such, it is virtually impossible for designers (also known in the industry as OEMs) to "standardize" the firmware for the BMCs that they are designing and subsequently manufacturing for their customers. For this reason, BMC firmware is typically customized for each configuration requested by separate customers.

The current approach to configuring a BMC for use on a particular baseboard configuration is to manually incorporate into the BMC firmware a software routine containing information identifying the sensors and devices that are specified for that particular configuration.

Therefore, heretofore unaddressed needs still exist in the art to address the aforementioned deficiencies and inadequacies.

SUMMARY

In one aspect, the present disclosure relates to a computer-implemented method for modeling a configuration of components connected directly or indirectly to a baseboard of a computer system. In certain embodiments, the method includes: (a) defining a group of device description files at a network based firmware generator, each device description file describing a component in a set of components which is selectively included in the configuration, and each device description file specifies the identification information associated with the component to which the device description file is associated, (b) providing, at a remote computing device in communication with the firmware generator via a network, a graphical user interface configured to allow a user to visually generate a configuration instruction of baseboard firmware and send the configuration instruction to the firmware generator, and (c) constructing a firmware image at the firmware generator in accordance with the configuration instruction. The network includes at least one of the Internet, an intranet, a Wi-Fi network, an enterprise network, a local area network, a wide area network, a telecommunication network, and a mobile communication network.

In certain embodiments, the method also includes: authenticating, at firmware generator, a login request sent from the graphical user interface for a user; detecting, at the graphical user interface, a selection of one or more components to be included in the firmware configuration file; in response the selection, at the graphical user interface, constructing a first request having information of one or more selected components; sending, at the graphical user interface, the first request to a web server of the firmware generator; receiving the first request at the web server; copying a device description file of each of the one or more selected components to a firmware configuration file, the device description file specifying identification information associated with the each component in accordance with the request; validating firmware configuration file according to a set of predetermined rules; sending, at the web server, a response to the graphical user interface, the response indicating whether the selection is valid; displaying the response on the graphical user interface; and debugging the configuration file at the firmware generator.

In certain embodiments, the graphical user interface is a web page rendered by a web browser. The graphical user interface is used to: render on the web page a first portion with graphical icons, each of the graphical icons represents a component in a set of components which may be included in the configuration; render on the web page a second portion for creating a model of the configuration of the baseboard using the plurality of graphical icons included in the first portion; generate, at the web browser, a second request for selecting a first component, and the second request is formed by a user dragging a first graphical icon representing the first component from the first portion into the second portion; and send the second request to the firmware generator and displaying the first graphical icon in the second portion.

In certain embodiments, the method includes: receiving, at the web browser, a third request for connecting the first component to a particular contact pin of a second component, and a second graphical icon representing the second component is displayed on the second portion; in response to the third request for connection of the first component to the particular contact pin of the second component, sending the third request from the web browser to the firmware generator; analyzing, at the firmware generator, the requested connection of the first component to the particular contact pin of the second component and determining whether the first component is a component which may be appropriately connected to the particular contact pin; displaying, at the web page, the first graphical icon as connected to the second graphical icon if the analyzing act determines that the connection of the second component to the particular contact pin is proper; and presenting an error message on the web browser if the analyzing act determines that the first component is not a component specified for proper connection to the particular contact pin.

In certain embodiments, the configuration instruction is configured to instruct the firmware generator to at least one of: (a) create a customized firmware for a destination computer by selecting a system-on-a-chip and one or more components from a module code library of the firmware generator, (b) define a customized firmware, (c) add a feature to or remove a feature from the customized firmware, (d) build a firmware image by compiling and debugging module codes of selected features from a module code library, (e) test a customized firmware including manual and automatic testing, (f) automated firmware development, and (g) deploy the firmware image to a destination computer. The feature is a function provided by the selected component and described in the corresponding device description file, a module code of each feature exists in the module code library of the firmware generator. The module code library includes at least one of source code and binary code.

In certain embodiments, each device description file includes information for configuring a management module to control an associated component based on information received from an associated component. The management module includes a software module operable for implementation on a computer system. The management module includes a baseboard management controller (BMC) operable for being communicatively connected to the baseboard.

In another aspect, the present disclosure relates to a system for configuring a firmware image of a service processor. In certain embodiments, the system includes: a firmware generator executed on a processor of a computing device. The firmware generator includes: (a) a group of Service Pack Extension (SPX) packages in a firmware configuration library, and each of the SPX package corresponding to a specific SPX feature and including a firmware data module, (b) a web server configured to send graphical user interfaces to a client computer through a network, and the graphical user interfaces are configured to allow a user to visually select one or more of the SPX packages to be included in a SPX project, and (c) a firmware builder configured to build the firmware image of the service processor by incorporating the selected SPX packages in the SPX project. The network includes the Internet, an intranet, a Wi-Fi network, an enterprise network, a local area network, a wide area network, a telecommunication network, and a mobile communication network. The firmware data module includes at least one of source code and binary code.

In certain embodiments, the SPX packages includes at least one of: webserver, WAMAN, Security protocols, terminal server (SSH/telnet), Authentication types, Discovery tools, test tools, IPMI, CIM, PMCP Utility, SMASH, SVNSPX, WDP, virtual media, and media redirection. The graphical user interfaces are sent securely from the computing device to the client computer. The graphical user interfaces are configured to: (a) on an SPX package space, render graphical icons, and each of the graphical icons represents one of the SPX packages; (b) receive a user instruction selecting a first SPX package to be included in the SPX project, and (c) in response to the user instruction, display a graphical representation showing that the SPX project includes the first SPX package. These graphical user interfaces enable the user to select more than one package of the SPX packages. These graphical user interfaces allow the user to test the SPX project. The SPX project test can be done manually or automatically. These graphical user interfaces also allows the user to debug during the firmware generation process.

In a further aspect, the present disclosure relates to a non-transitory computer storage medium. In certain embodiments, the non-transitory computer storage medium contains computer-executable instructions. When these computer-executable instructions are executed by a processor of a network based firmware generator, these computer-executable instructions cause the processor to: (a) define a group of device description files at the network based firmware generator, each device description file describing a component in a set of components which is selectively included in the configuration, and each device description file specifies the identification information associated with the component to which the device description file is associated, (b) send a graphical user interface to a remote computer through a network, the graphical user interface configured to allow a user to visually generate a configuration instruction of baseboard firmware and send the configuration instruction to the firmware generator, and (c) construct a firmware image at the firmware generator in accordance with the configuration instruction.

In certain embodiments, the non-transitory computer storage medium includes computer-executable instructions for the processor to: authenticate a login request sent from the graphical user interface for a user at the firmware generator; detect a selection of one or more components to be included in the firmware configuration file at the graphical user interface; in response the selection, at the graphical user interface, construct a first request having information of one or more selected components; send the first request to a web server of the firmware generator at the graphical user interface; receive the first request at the web server; copy a device description file of each of the one or more selected components to a firmware configuration file, the device description file specifying identification information associated with the each component in accordance with the request; validate firmware configuration file according to a set of predetermined rules; send a response to the graphical user interface, the response indicating whether the selection is valid at the web server; and display the response on the graphical user interface.

BRIEF DESCRIPTION OF THE DRAWINGS

The accompanying drawings illustrate one or more embodiments of the disclosure and, together with the written description, serve to explain the principles of the disclosure.

Wherever possible, the same reference numbers are used throughout the drawings to refer to the same or like elements of an embodiment, and wherein:

FIG. 1 schematically shows a block diagram of a network based firmware generator according to certain embodiments of the present disclosure;

FIGS. 2A-2D illustrate exemplary SPX Package generation interfaces for generating SPX projects and SPX packages according to certain embodiments of the present disclosure;

DETAILED DESCRIPTION

Figure 2A:
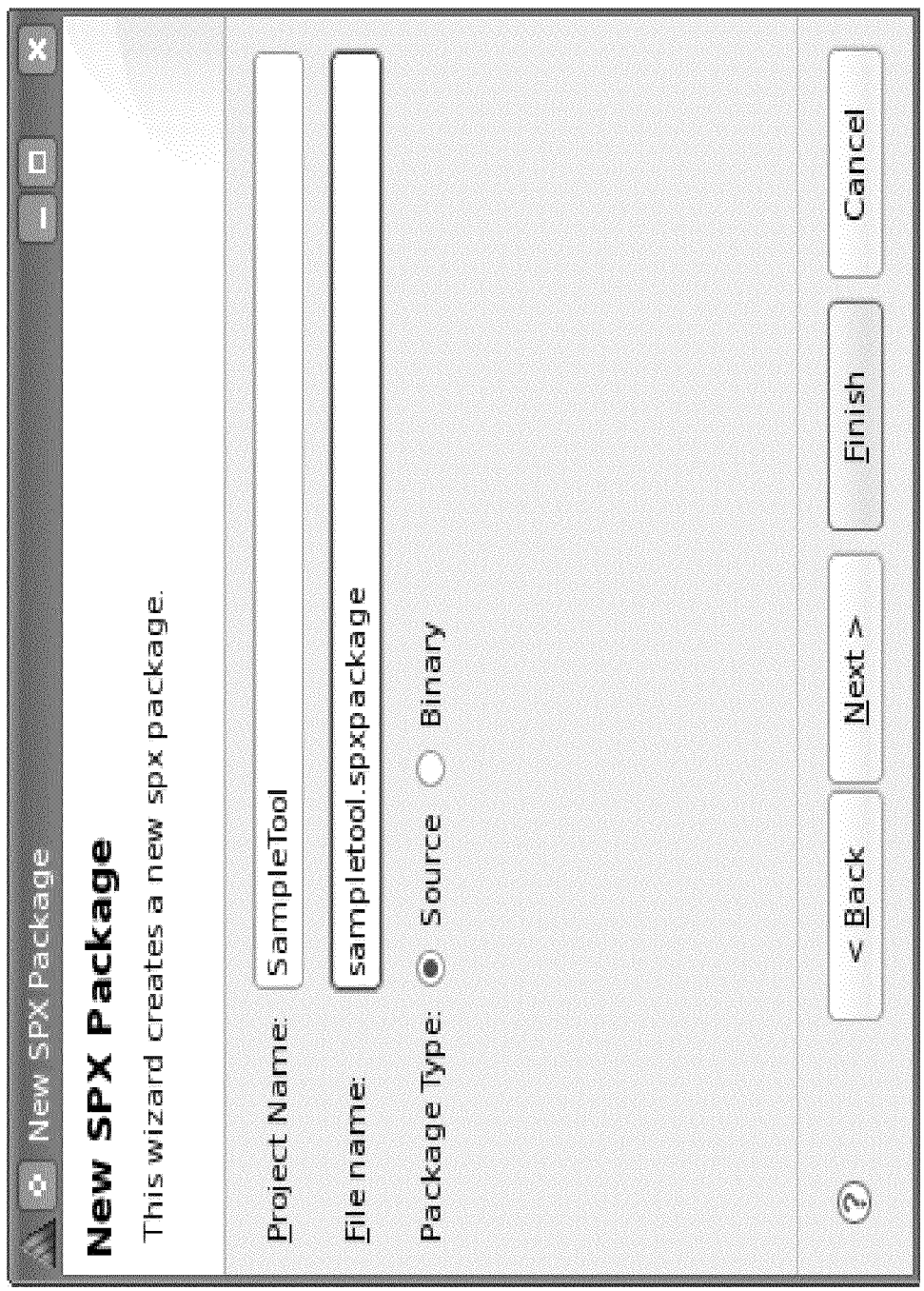

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Referring to FIG. 1, a conceptual illustration of network based tools for firmware feature configuration and firmware image generation in accordance with an embodiment of the present disclosure. The system includes a network based firmware generator 110 in communication with client computer systems 106-I, I=1, 2, . . . , N through a network 102. The network 102 can be the internet, an intranet, or any connected network. The firmware generator 110 is a firmware feature configurator and firmware image generator system and it is accessible by a client application 109 through the network 102. Traditionally a firmware generation module is locally installed on a client computer. The client computers 106-I in this embodiment can allow clients throughout the world via network connections to customize firmware images based on specific requirement of their designs, to configure, to build, to test, to debug, and generate firmware image features.

The firmware generated by the firmware generator 110 typically is for use with a baseboard management controller (BMC) or a service processor. In general, a BMC is a microcontroller that monitors operation of a computer system. In a more specific embodiment, the BMC monitors health-related aspects associated with a host computer system, such as temperature of components within the computer system chassis, speed of rotational components (e.g., spindle motor, CPU fan, etc.) within the system, voltage across or being applied to one or more components within the system and available or used capacity of memory devices within the computer system. In addition, a BMC can also include features, such as USB media, Systems Management Architecture for Server Hardware (SMASH), IP V6, and virtual media, and virtual keyboard etc.

To accomplish the above-noted, and other, monitoring functions, the BMC is communicatively connected to one or more components (such as sensors) of the host computer through various communication channels. For example, the BMC can connect to a component directly or by way of a management bus. In one embodiment, these components include sensor devices for measuring various operating and performance-related parameters within the computer system. The sensor devices may be either hardware or software based components configured or programmed to measure or detect one or more of the various operating and performance-related parameters. In a management bus, the component that initiates communication on a bus is referred to a master and the component to which the communication is sent is referred to a slave. The BMC functions as the master on the management bus in most circumstances, but may also function as a slave in other circumstances. Each of the various components communicatively connected to the BMC by way of the management bus can be addressed using a slave address.

The management bus is used by the BMC to request and receive various operating and performance related parameters from the one or more components also communicatively connected to the management bus. In certain embodiments, the management bus communicatively connects the BMC to the CPU temperature sensor and the CPU fan, thereby providing a means for the BMC to monitor and/or control operation of these components. Other components may include, without limitation, tachometers, heat sensors, voltage meters, amp meters, and digital and analog sensors. In an embodiment, the management bus is an I$^2$C® bus, which is manufactured by Phillips Semiconductors® and described in detail in the I$^2$C® bus Specification, version 2.1 (January 2000).

In certain embodiments, the BMC can include firmware that adheres to the Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 1.5, release date Feb. 20, 2002, is incorporated by reference. In addition to IPMI features, the firmware can include other features such as USB media, SMASH, IP V6, and virtual media, and virtual keyboard etc. These features are parts of the selectable packages to the firmware so that each individual computer vendor can customize their firmware to support certain features selected. Each individual computer vendor can create their own customized firmware through our cloud-based firmware generator 110. Each customized firmware is a project in the firmware generator 110, and each project includes one or more Service Pack Extension (SPX) packages, and each SPX package supports at least one feature or function of the BMC.

The BMC monitors operating and performance-related parameters received from various components of the computer system in order to determine whether an "event" is occurring within the computer system. The BMC may also control one or more components of the computer system in response to the occurrence of an event.

In certain embodiments, the client application 109 accesses to the network based configuration execution module 114 can be through a secure network connection.

In certain embodiments, each of the client computer systems 106-I, I=1, 2, . . . , N has a web browser 109-I, I=1, 2, . . . , N. The web browser 109-I is used as a graphical user interface. On the other hand, the firmware generator 110 includes a network based configuration execution module 114, a web server 112, and a firmware configuration library 116. Each of the users uses a web browser 109-I of the client computer system 160-I to access the web server 112. The web server 112 can generate one or more configuration web pages. As will be described below, the web server 112 transmits the configuration web pages to the web browser 106, which in turn displays the configuration web pages to the user. The user can graphically configure the BMC firmware through the configuration web pages.

In certain embodiments, the client computer system 106-I may be a regular computer or a special purpose computer also with network connectivity. In certain embodiments, the client computer system 106-I includes one or more operating systems as well as one or more application programs. The operating system has a set of programs that control operations of the client computer system 106-I. The set of application programs, inclusive of certain utility programs, may also provide a graphical user interface to the user. The web browser 106 is an application program and runs on the operating system. The operating system is operable to multitask, i.e., execute computing tasks in multiple threads, and thus may be any of the following: MICROSOFT CORPORATION's "WINDOWS XP" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. The web browser can be one of: SAFARI, CHROME, FIREFOX, and INTERNET EXPLORER.

In certain embodiments, each of the client computer systems 106-I, I=1, 2, . . . , N has a web browser 109-I, I=1, 2, . . . , N, and each user uses the configuration web pages display on the web browser 109-I as a graphical user interface to interact with the network based configuration execution module 114. The configuration web pages can (a) allow a user to login to the web server of the network based configuration execution module 114, (b) display various user interfaces to the user, (c) allow the user to interact with the web server to visually configure the firmware through a graphic interface, (d) display any configuration success or failure message, and/or (e) allow the user to build, download, test, and deploy the firmware configuration.

In certain embodiments, the web browser 109-I can receive the configuration web pages and accordingly display user interfaces (UIs) defined by the configuration web pages. The web browser 109-I allows the user to enter various user inputs for logging into the web server of the network based configuration execution module 114.

In certain embodiments, the configuration web pages can display a login screen. The login screen for example has a username field, a password field, and field for entering a web address of the web server 112 of the network based configuration execution module 114. The web browser 109-I receives username and password entered by the user. Upon the user presses an "enter" or "login" button on the login screen, the web browser 109-I construct a user-authentication input HTTP request to pass the input to the web server 112 of the network based configuration execution module 114. The web server 112 of the network based configuration execution module 114 processes the user-authentication input and in response returns an execution result to the web browser 109-I. In response to the user-authentication input, the result can be an "access granted" message when the user is authorized by the web server 112, or an "access denied" message when user is not authorized. Accordingly, the web browser 109-I can display those messages on the display screen of the client computer system 160-I.

When a first user logs into the web server 112, a session is started for the first user. When a second user logs into the web server 112, a separate session can be started for the second user. These two sessions and any subsequent other sessions running on the web server 112 typically are separate and independent.

As shown in FIG. 1, the firmware generator 110 includes: (a) a web server 112, (b) a configuration execution module 114, and (c) a firmware configuration library 116.

In certain embodiments, the web server 112 is network connected and it is accessible through a specified URL. When a user wants to access the firmware configuration tools, he or she can, for example, type the URL in a web browser 109. The web browser 109 can receive an SPX Package generation interface (e.g. a web page) from the web server 112 and display the interface to the user.

The configuration execution module 114 includes following major components: (a) an SPX Configurator, (b) an SPX Builder, and (c) an SPX Debug.

The firmware configuration library 116 includes source code or binary file for all firmware features available for the user to select and incorporate into a customized BMC firmware. Each firmware feature is specified in an SPX package. A firmware image includes one or more features specified by the SPX packages. These features can include one or more of:
IPMI—for supporting IPMI standards,
CIMSDK—for supporting common information model (CIM),
PMCP Utility—for supporting Platform Manager Configuration Program (PMCP) for graphical firmware porting and sensor configuration,
SMASH—for supporting the Systems Management Architecture for Server Hardware,
SPX-BUILDER—for supporting SPX builder,
SVNSPX—for supporting user interface to SVNSPX Command line script from within the firmware generator,
WDP—for providing a collection of plug-ins for Website Development Project (WDP),
WDPX—for providing a collection of Web Development Plug-in Extension (WDPX) having some extended features of WDP, and
XMS—for providing a set of plugins for customizing XMS Web UI Target, XMS Flex Base and XMS Plug-in.

In certain embodiments, the IPMI functions of the BMC firmware can include one or more of:
Multiple BMC Controller Support: such as Renasas H8S 2166, 2167, 2168, PowerPC/RISC/MIPS processors, and easily ported to many other BMCs;
Side-band Manageability over Board LAN NIC, implementing IPMI 2.0 Specification (jointly developed by Dell, HP, IBM and NEC);
System Interface, Event Log(SEL), Sensor Support, Detailed System Information such as SDR Repository, and FRU Information;
Health Monitoring, Watchdog Timer, LAN Alerting, Event Generation, Serial over LAN;
Remote Power Control: Reset, Power On/Off, Power Cycle, Graceful Shutdown;
Remote Management Control Protocol including Encryption and Enhanced authentication;
PMCP Graphical Porting Utility with "Drag-n-Drop" Interface for Sensor Configuration;
PDK Utility for Extending the Firmware Stack and Allowing OEM Customization; and
Optional embedded KVM chip enhancement.

In certain embodiments, the PMCP utility is designed to customize IPMI 2.0 firmware stack according to specific OEM requirements for OEM customers utilizing SP Service Processor for highly integrated BMC; the combination of PMCP and PDK utility provides even greater flexibility and extendibility in the firmware. The key features of the PMCP utility include:
an easy-to-use GUI allows users to add or remove a device in an IPMI firmware project by simply dragging and dropping the device icon;
Device Description Files (DDFs) for easy addition of future devices to the library;
Automatic SDR records creation with no need of user manual input;
Sensor Monitoring and Device Control Information is provided to the firmware as tables and IPMI Soft Processor code;
GPIO Configuration allows the user to select the functions and what sensors or devices, if any, are connected to it;
Firmware Parameters Configuration, such as PEF, Channel Info, User Info, ICMB connector info and I2C bus info;
Simulating sensor devices and alert generations without the real hardware.
The PMCP Utility is available, MegaRAC-PM IPMI firmware solution and AMI MegaRAC embedded management cards.

Figure 2B:
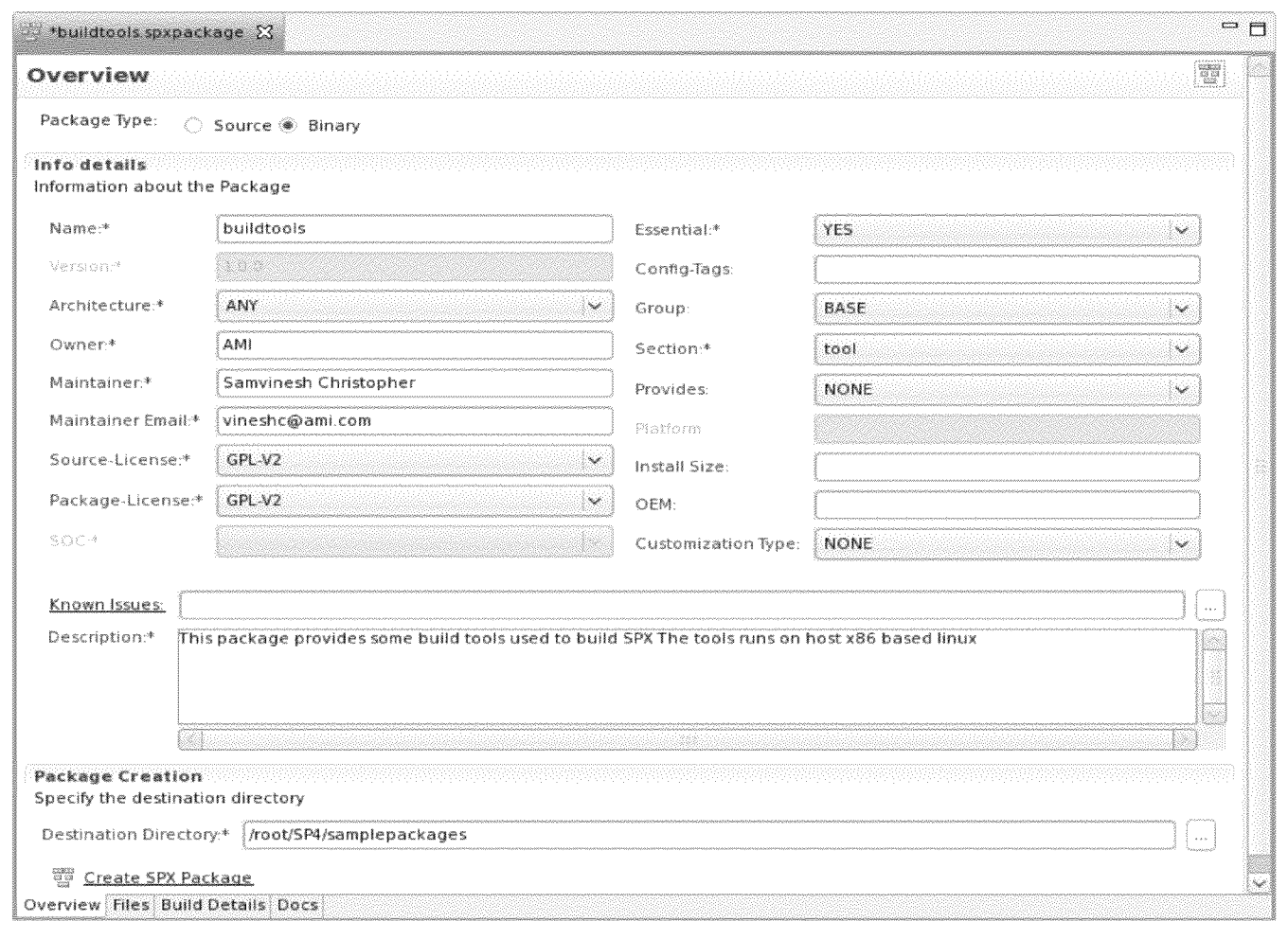

FIG. 2A shows an exemplary SPX Package generation interface at the client computer 106 for generating an SPX project and an SPX package. FIG. 2B shows another exemplary SPX Package generation interface at the client computer 106 for generating an SPX package. In certain embodiments, when a user wants to configure a customized BMC firmware, the user uses the SPX Package generation interface displayed at a web browser 109-1 on a local computer 106-1 to access the firmware generator 110 through the web server 112 of the firmware configurator 110. When the user logs into the web server, a new session (such as a HTTP session) is started. The web server receives a command from the user to create a project (i.e. create a new firmware) by using a SPX configurator on the web server 112. The web server 112 can instruct the configuration execution module 114 to sets up a new project in accordance with the commands. The configuration execution module 114 retrieves a list of available firmware features (SPX packages) from the firmware configuration library 116 and instructs the web server 112 to send the list to the user interface for display at the SPX Package generation interface.

The user can then specify certain firmware features (SPX packages) the firmware intends to include. The SPX Package generation interface can transmit the user's specification to the web server 112, which in turn transmits the specification to the SPX builder. The SPX builder can copy the user's selection of certain features into an SPX firmware building space either in source code or binary code, as specified. The SPX builder compiles the source codes of the selected SPX packages, and links the binary codes of the selected SPX packages to generate the customized BMC firmware image. The user can also use the SPX debugger to set break point, step through the program to debug the firmware, for example, during run time. It is also possible to configure the project for debug while building.

SPX provides higher level of modularity in the stack, ability to easily configure the complete stack by selecting and deselecting the features which are now available in the packages form. The stack components like web, and OEM level changes can be completely customized and enriched with the firmware generator 110. SPX packages are included with firmware generator 110 to create, edit, customize and build the SPX Packages and Projects. SPX Package is defined as a set of files and rules defining a specific feature of the service processor. Multiple SPX packages together forms the entire functionality of the service processor. SPX Packages can be separated into two different types of packages: (a) Source package, and (b) Binary Package. A firmware image can be created from both the Source and Binary packages using SPX builder.

In certain embodiments, the SPX Package generation interface at the client computer 106 can be configured to receive one or more of the below user instruction:
  Creating a New SPX Package for a specific feature of the BMC firmware using a New SPX Package Wizard;
  Editing SPX Package for allowing a user to customize the specific feature of the BMC firmware;
  Adding/Editing License for allowing the user to add and/or edit the license related to the SPX packages and add new license to the SPX packages;
  Importing one or more SPX Packages from an existing SPX project;
  Duplicating SPX Package that is already configured and tested;
  Adding/Editing SPX Configurations for allowing a user to customize SPX package, to add or edit the Architecture, Customization Type, System on a Chip (SOC), Group and Provides using SPX Configuration Preference page;
  Importing spxconfs xml files by using the Import spxconfs file wizard. This is the file that actually contains all SPX configurations such as Architecture, Customization Type, SOC, Group and Provides; and
  Adding/Editing Platform and Group for allowing a user to add, edit, or remove the fields of Group.dsc and PLATFORM.dsc configuration files.

As described earlier, each SPX package specifies a specific feature of the BMC firmware. In certain embodiments, the specific features of the BMC firmware include:
  IPMI Message Interface Support
    System Interface Support: Keyboard Controller Style (KCS), System Management Bus (SMBus), Remote Management Control Protocol (RMCP), Multiple Payload, Enhanced Authentication, and Encryption
    Intelligent Platform Management Bus (IPMB)
    Local Area Network (LAN) and shared NIC
    Universal Serial Bus (USB)
    Intelligent Chassis Management Bus (ICMB)
  Media Redirection
    Simultaneous floppy, Hard disk or USB and CD or DVD redirection.
    Efficient USB 2.0 based CD/DVD redirection with a typical speed of 20XCD.
    Support for USB key
    Completely secured (Authenticated or Encrypted) remote KVM or vMedia.
  IPMI 2.0 based management
    BMC stack with a full IPMI 2.0 implementation
    Customizable sensor management
  Event Log and Alerting
    Read Log events
    Sensor readings
    Simple Network Management Protocol (SNMP) traps
    E-Mail alerts
  Sophisticated User Management
    IPMI based user management
    Added security with SSL (HTTPS)
    Multiple user permission level
    Multiple user profiles
  Lightweight Directory Access Protocol (LDAP) support
    Direct LDAP support from the device
    Open LDAP (Generic LDAP) supported
  Remote Server Power Control
    Server's power status report
    Support for remotely power-cycle, power-down, power-up and reset the server
  Common Information Model (CIM)
    CIM Object Manager (CIMOM)
    True Object Manager with CIM class handling
    Creating class, instance and working with the instances
    Core support for all Distributed Management Task Force (DMTF) profiles
    Extendible for additional Original Equipment Manufacturer (OEM) profiles
    Systems Management Architecture for Server Hardware (SMASH) and Command Line Protocol (CLP) support
  Secure Shell (SSH) based Serial Over LAN (SOL)
    Power control of the server
    Support for all Distributed Management Task Force (DMTF) Profiles
    Complete command support
    Customizable parser for easy update to future modifications in grammar
    Dynamic target discovery
    Firmware update
    Role based authentication and authorization
    Output filtering Configurable profile mapping. (CIM Methods to SMASHCLP command mapping)
OEM command and target
Web Services for Management Support
  Supports Web Services for Management (WSMAN) as well as Web Services Common Information Model (WS-CIM)
  Rich Software Development Kit (SDK) capability for OEM extensions
  Organically fully developed code as library
  Can work with any web server
  Currently supported web server-GoAhead
  HTTP and HTTPS support
  Complete WSMAN support—Discovery, Enumeration, Get, Put, Subscribe and gather Events.
  Rich client library support (C, Java, JavaScript)
Web based configuration
  Full configuration using web user interface (UI)
  Fail-safe firmware upgrade
  Multi-language support in Web interface with English as the currently supported language These specific features of the BMC firmware can be individually incorporated into a customized BMC firmware, and customers can also select individual feature packages and build into a specific project according to their needs.

FIG. 2C shows an SPX Package generation interface at the client computer 106 through which a user can inspect the SPX packages in a SPX project. Customers can build their own customized feature sets in the following SPX project build process.

Figure 2D:
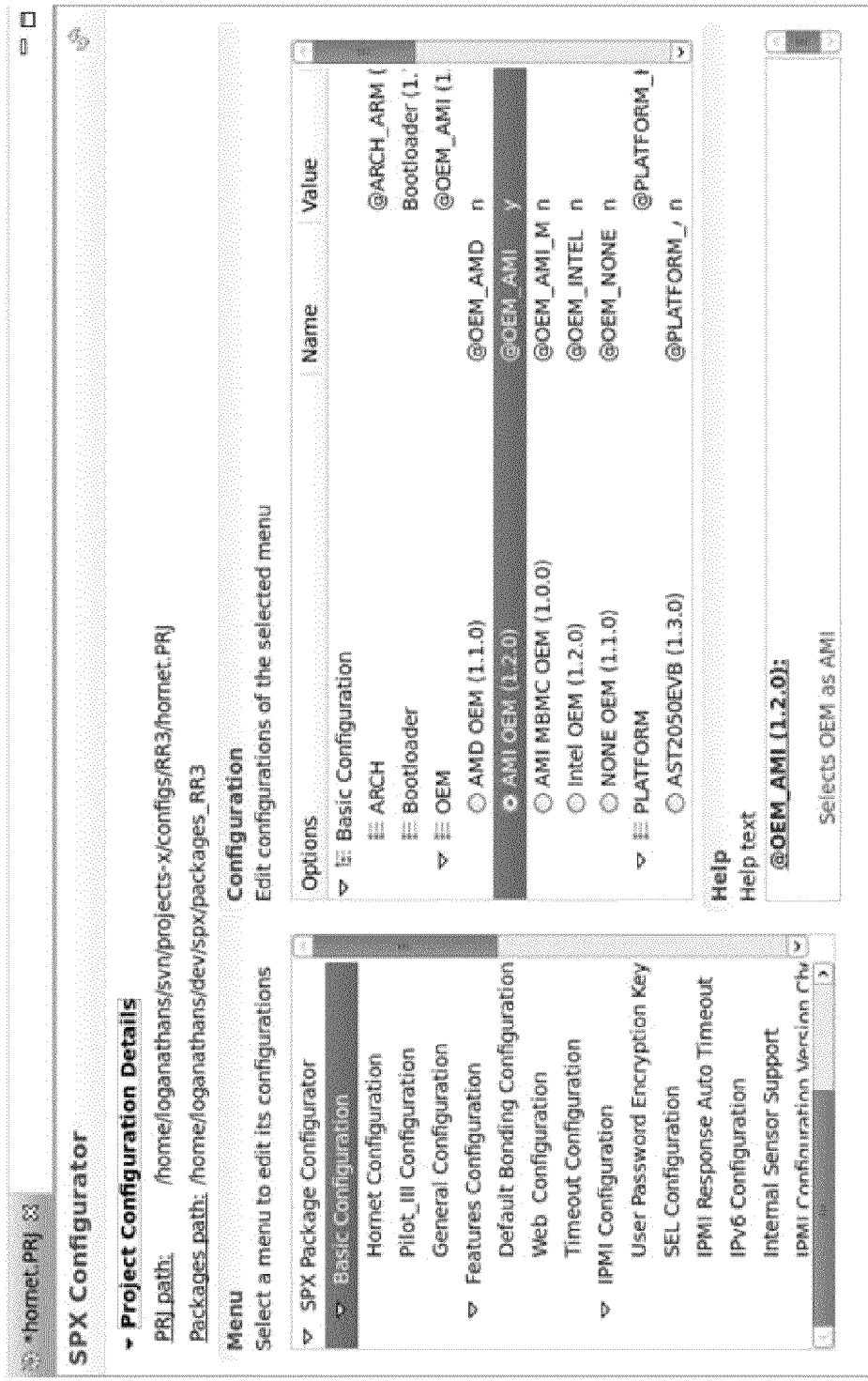

FIG. 2D shows an SPX Configuration interface at the client computer 106 through which a user can configure the entire SPX project.

SPX Project Configurator is a tool to create SPX Project configuration. It provides menu of packages to be selected. The user can select the wanted packages and it will create a file with .PRJ extension. This file is used to build the packages with the features selected.

In certain embodiments, the SPX Configurator performs following functions:
  Creating a New SPX Project Configuration: when a new SPX project is created by a user, a file with a PRJ extension is created;
  Opening an existing SPX Project Configuration for editing or modification;
  Editing SPX Project Configuration for editing (i) menu section, (ii) configuration section, (iii) help section, and (iv) project configuration detail section; and
  Errors in Editing Project Configuration: if errors occur during the creating, opening or editing an SPX Project configuration, the SPX Project Configurator displays error message to prompt the user to correct the configuration errors.

Figure 3A:
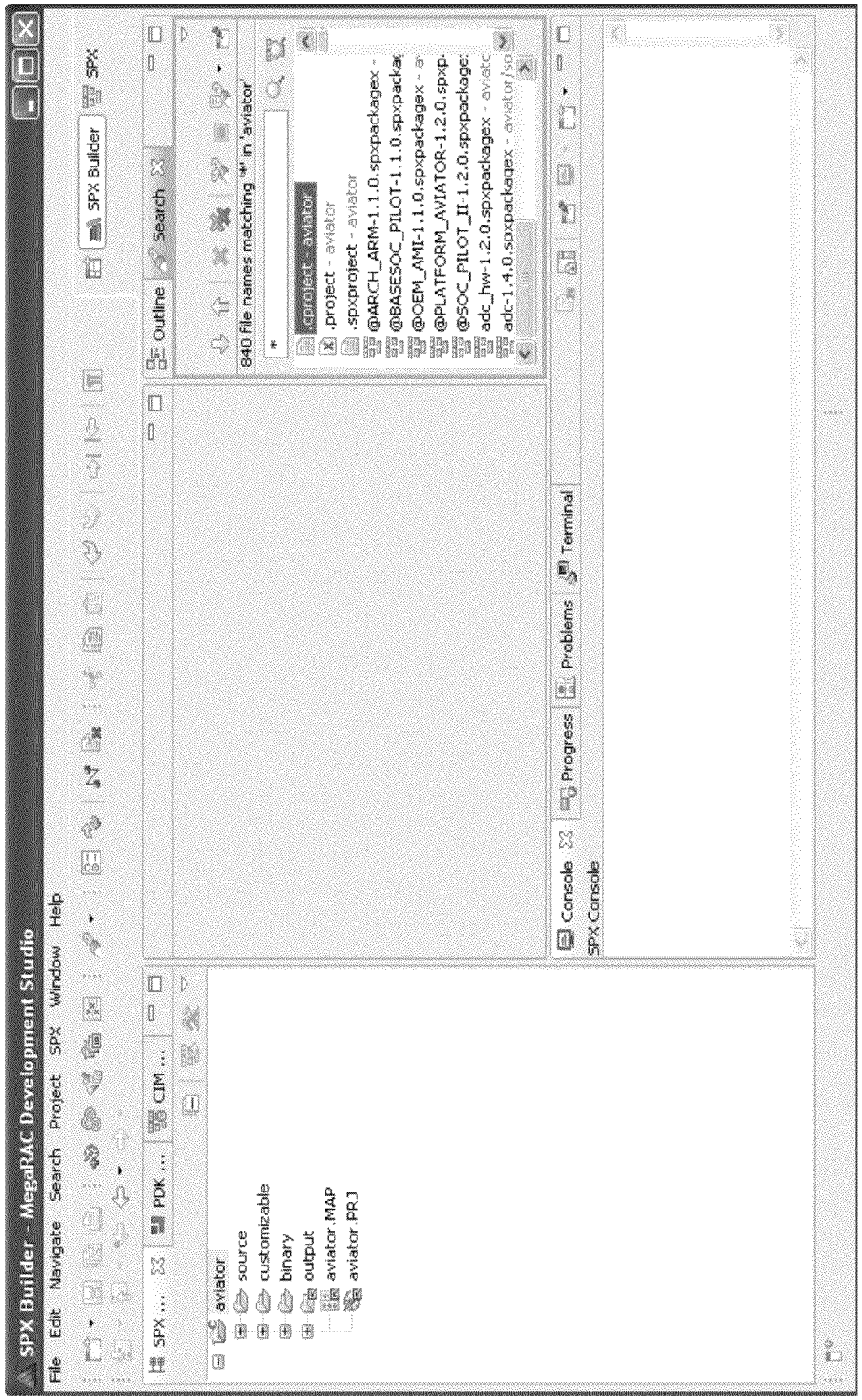
FIGS. 3A and 3B illustrate exemplary SPX Build interface screens according to certain embodiments of the present disclosure.
Figure 3B:
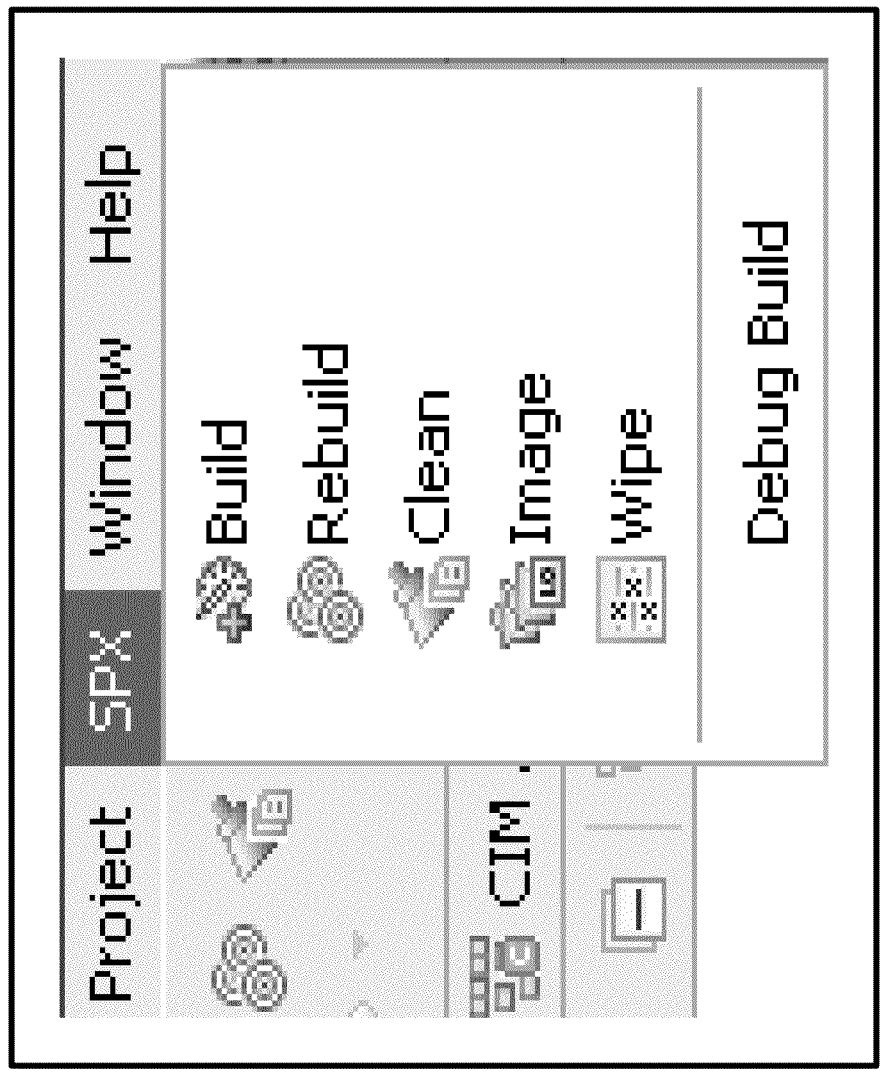

SPX Builder provides an environment to create, update and build the SPX packages in the SPX Project. It eases the development of the SPX projects. A user can create a new project or load an existing project where the packages can be modified, repacked, built and rebuilt. It also supports build and rebuild of the entire project. FIGS. 3A and 3B illustrate two exemplary user interface screen shots displayed at the client computer 109 in communication with the SPX Package Builder. In certain embodiments, the SPX Builder performs following functions:
  Creating or deleting a Project that contains one or more SPX packages;
  Viewing SPX Project Properties that displays a list of properties pertaining to a particular SPX project and the details of any SPX project;
  Updating Package Properties for editing source, customizable and binary packages;
  Customizing Packages under customizable folder of the project;
  Repacking Packages directly from an SPX Package explorer after editing or customizing SPX packages, and repacking the patch applied source packages and then removed the patch files from PRJ file;
  Show Modification in Packages enables graphical representation of modifications done to various SPX packages within an SPX project. In addition to viewing the differences, the desired packages can be repacked directly using this feature;
  Open Package Dependency is used to display a package and all its dependencies;
  Creating Patch Package for a modified package;
  Build/Rebuild/Clean/Wipe at SPX Project level: (i) Build a project—Compiles the project's C source code, (ii) Rebuild a project—cleans, builds a project and compiles the project's C source code from scratch, (iii) Clean a project—deletes object files of the project, (iv) Wipe a project—deletes a project, extracts the packages again and rebuilds the project, (v) Image—deletes the image tree and create a new image tree of a project;
  Build/Rebuild/Clean/Wipe at specific SPX package level: (i) Build a package—Compiles the package's C source code, (ii) Rebuild a project—cleans, builds a package and compiles the package's C source code from scratch, (iii) Clean a package—deletes object files of the package, (iv) Wipe a package—deletes a package, extracts the packages again and rebuilds the package;
  Creating Image for SPX Project cleans the existing ImageTree and creates a new clean ImageTree and an Image;
  Editing Project Configuration allows the user to edit the project configuration (i.e.) editing of .PRJ file, refresh project configuration, and update PRJ from SPX package explorer;
  Adding New SPX Package to SPX Project allows the user to add a new SPX package into an existing SPX project;
  Editing MAP File allows the user to edit the MAP file (*.MAP) containing details about each section of the ROM image. This file is used by SPX build process to create output ROM image (rom.ima);
  SPX Favorites provides the user a quick and easy access to the necessary packages grouped together in the SPX favorite folder;
  Show Packages Info allows the user to see all packages in the SPX project with its last update date, and export the package information of the SPX project to a file;
  SPX Build Preferences allows the user to edit/change/save the SPX Build preferences, such as compatibility mode, deleting older Package during the build, add/edit/delete environmental variables and setting the value of environmental variables;
  Import Build PRJ Folder allows the user to import an SPX Build PRJ folder updated externally;
  Import Encrypted Image Key Pair Wizard is used to import private and public keys with the extension of *.pem. These keys are used by Build Process to sign the generated image. During build process, public key will be copied to Image (/conf/directory) and later the public key is used for verifying the image;

Import/Export Preferences allows the user to maintain the vital preferences across various firmware generator versions;

Editing Bootloader Kernel Packages allows the user to edit and create diff files for Bootloader and Kernel packages;

Creating SPX Customer Project involves creating a set of customer packages for the desired platform and OEM, given the current packages and PRJ locations. The current platform specific packages will be converted to comply with the new platform given by the user, and the new platform specific PRJ is created in the customer location; and VUE customization allows the user to create and customize logo and banner displays.

The debugger lets the user to control the execution of a program by setting breakpoints, suspending executed programs, stepping through your code, and examining the contents of variables. SPX Debug is a remote debugging that allows the user to run a program in the target machine such as the destination computer 108 shown in FIG. 1, or a BMC on the same network and debug it from firmware generator. The system running the debugger (GDB) user interface is known as the local system which is nothing but firmware generator. The system where the debug engine (GDB server) runs is known as the remote system/target system/card.

In certain embodiments, the SPX Debug includes following options:

Build/Rebuild package with debug options:
build/rebuild individual package in debug mode for individual package, or
enable global debug flag for the entire project during a project build such that all packages will be built or rebuilt with debug flag Start Debugging: Debugging can be done only from application package. For example, to debug IPMI, the user need to debug an IPMIMain Package, and to debug GPIO, the user need to debug GPIOTool package.

Figure 4:
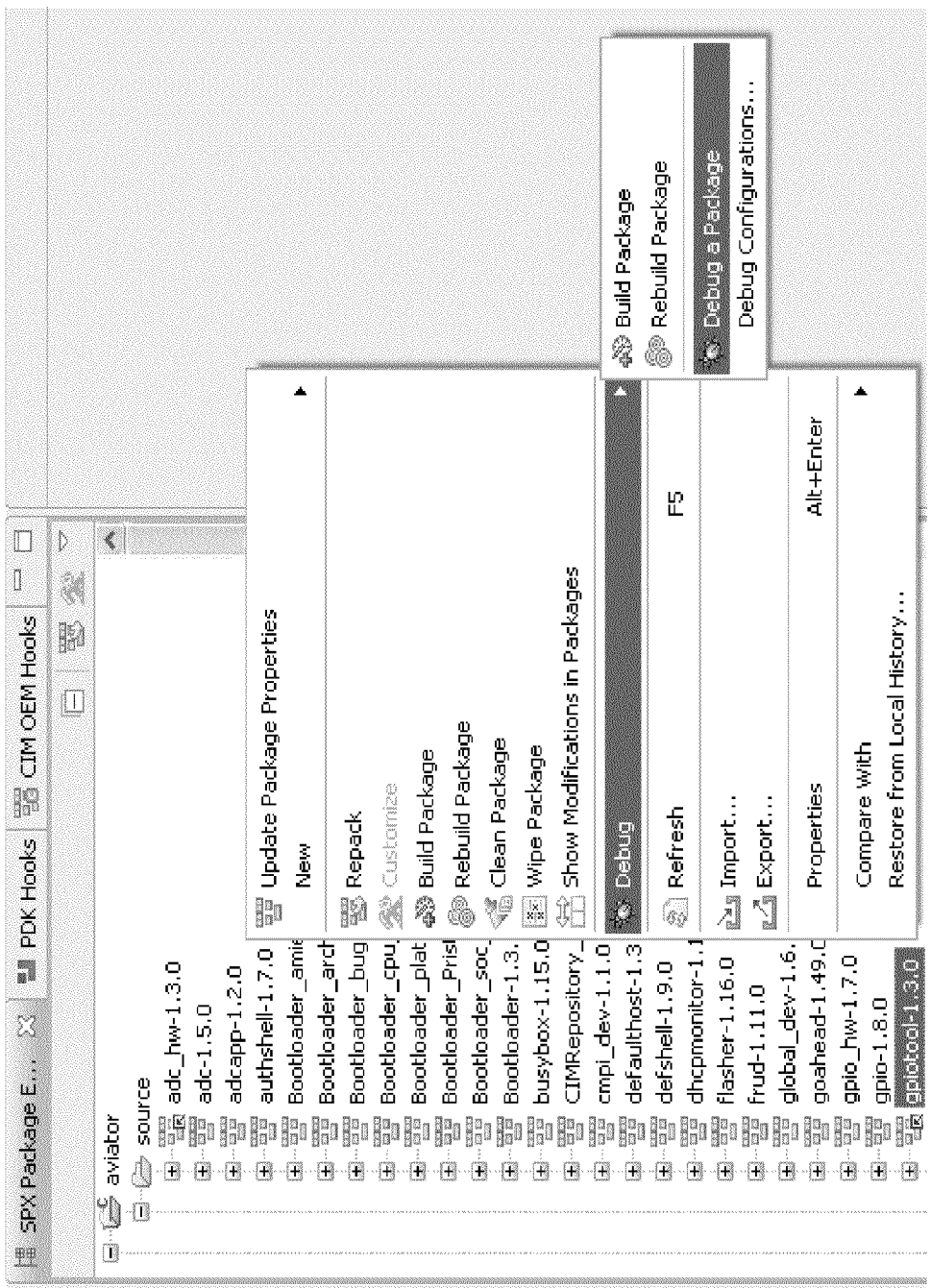
FIG. 4 illustrates an exemplary SPX Debug interface according to certain embodiments of the present disclosure.

FIG. 4 shows an exemplary user interface displayed at the client computer 109 in communication the SPX Debug.

Figure 5:
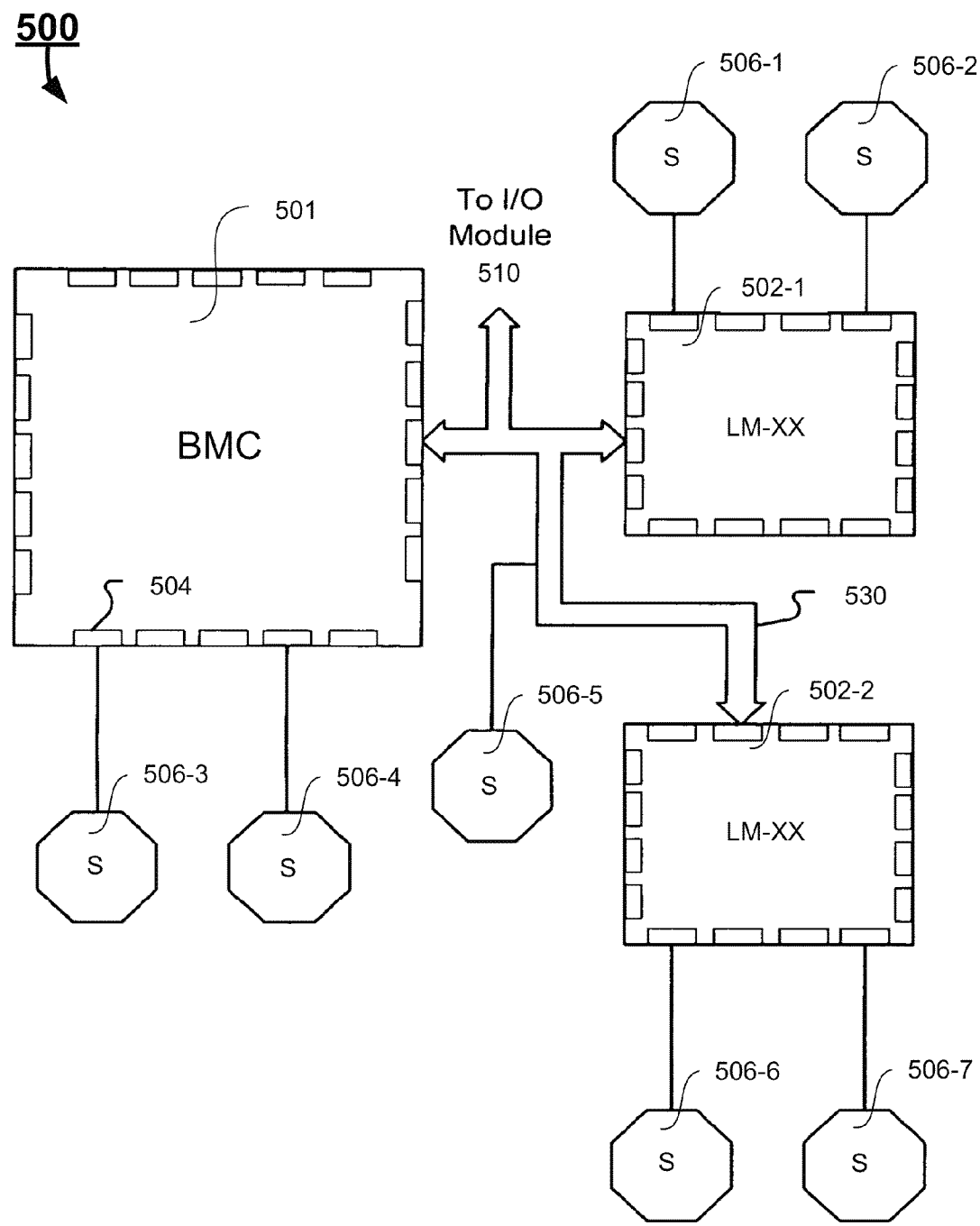
FIG. 5 illustrates a configuration of components communicatively connected to a BMC according to certain embodiments of the present disclosure.

Referring now to FIG. 5, an exemplary configuration of sensor devices 500 (e.g., 502-1, 502-2, 506-1, 506-2, 506-3, 506-4, 506-5, 506-6, and 506-7) communicatively connected to a BMC 501 in accordance with an embodiment of the present disclosure. The sensor devices include various types of sensors (506-1, 506-2, 506-3, 506-4, 506-5, 506-6, and 506-7) and sensor aggregation components 502-1 and 502-2. The sensors 506 measure or sense operating and performance-related parameters associated with the computer system. The sensor aggregation components 502 receive this information sensed by the sensors 506 and provide this information to the BMC for analysis, and more particularly, for determination on whether an "event" is occurring within the computer system.

The sensor aggregation components 502-1, and 502-2 are shown in FIG. 5 as LM-XX devices (e.g., LM-78 and LM-85 model logic components), but may be any type of hardware and/or software component capable of receiving sensed information and managing the delivery of this information to the BMC 501. Alternatively, the sensor aggregation components 502 may be operable to not only collect and forward sensed information, but also to analyze the sensed information to render advice on the parameters being monitored by the sensors 506. Even further, the sensor aggregation components 502 may be programmed with firmware operable to perform sensing and measuring functions substantially similar to those functions performed by the sensors 506.

As shown in FIG. 5, sensor devices (e.g., 502 and 506) are connected to, and therefore communicate with, the BMC by way of contact pins 504 located on the BMC 501. The sensor devices (e.g., 502, 506) may be connected to the BMC contact pins 504 either directly or by way of the management bus 530. Regardless of the implementation, the functionality of these sensor devices is the same: the sensors 506 sense or measure information and subsequently transmit this information to either the BMC or a sensor aggregation component 502; if to the sensor aggregation component 502, then the information is passed by the sensor aggregation component 502 to the BMC 501. The BMC then analyzes the information sensed by these sensor components (e.g., 502, 506) and either 1) issues an alert that an event is occurring; and/or (2) controls operation of one or more components within the computer system based on the determination that an event is taking place.

While the sensors 506 are described in general terms when describing FIG. 5, it should be appreciated that these sensors 506 may be digital or analog sensors that sense any type of information. For example, the sensors 506 may sense, without limitation, temperature of a component (e.g., a CPU) of a computer system, temperature within the chassis of the computer system, a voltage and/or current reading associated with a component of the computer system, or velocity and/or acceleration of a component (e.g., spindle motor, etc.) of the computer system. It is also contemplated that the sensors 506 may implemented as a software/firmware routine that senses information related to events associated with operation of either firmware or software modules implemented on the computer system. One such sensor 506 may be a software routine for detecting whether a particular software application program is "locked up," and therefore not operating properly.

Figure 6:
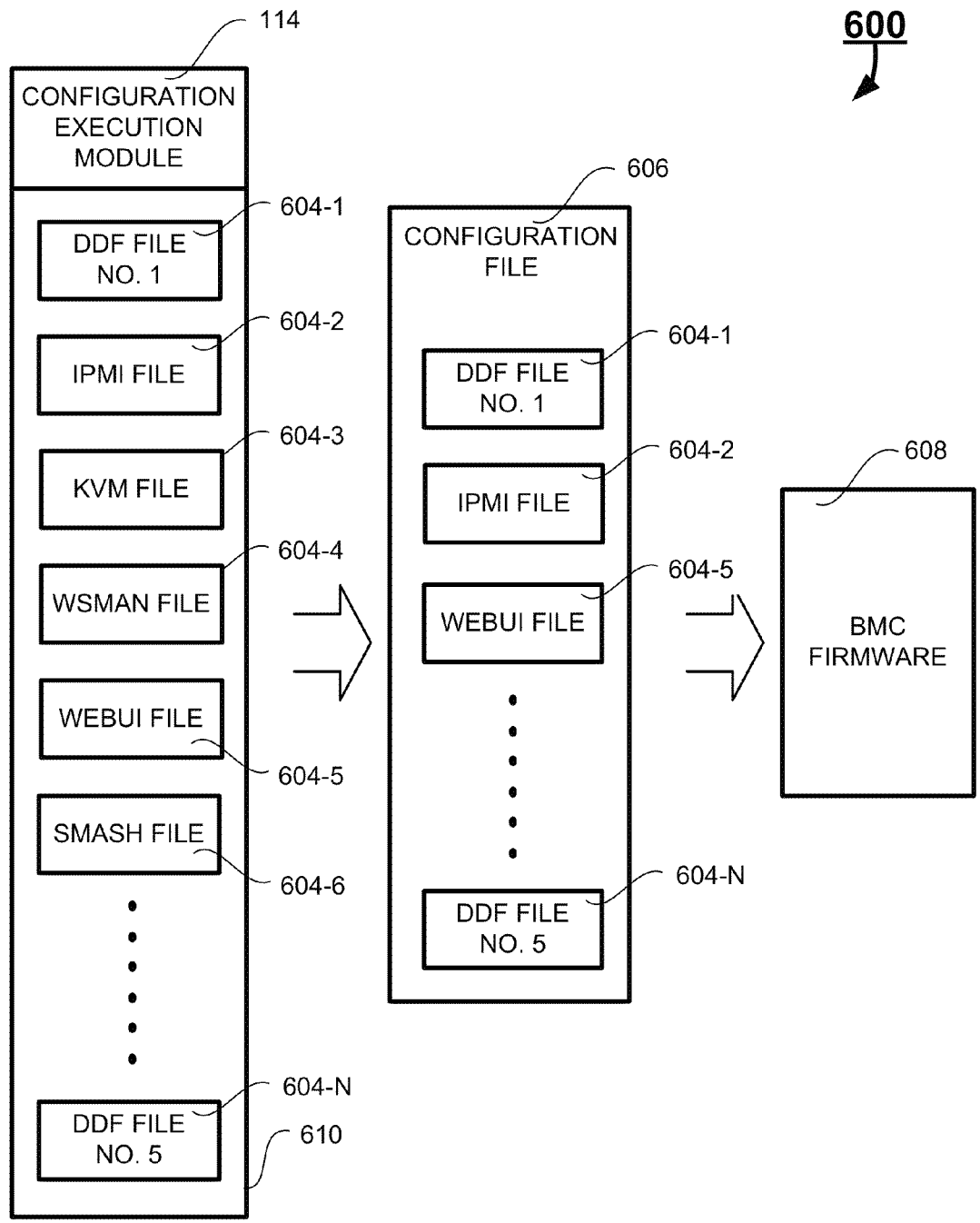
FIG. 6 shows a block diagram illustrating a firmware generator according to certain embodiments of the present disclosure.

Referring now to FIG. 6, an illustration of firmware/software modules at the network server side used for customizing BMC firmware 608 for a specific configuration is shown in accordance with an embodiment of the present disclosure. Once customized, the firmware 608 is loaded into the BMC for use in detecting the occurrence of events in an associated computer system.

In certain embodiments, at the client side, the web browser 106, displaying the configuration web pages, functions as a configuration graphical user interface (GUI), which will be described in detail below.

At the network server side, in certain embodiments, the firmware configuration library 116 can be a SPX feature package library 610 storing device description files and various other SPX component files 604-I, I=1, 2, . . . , N. The SPX component files can include one or more of IPMI files 604-2, keyboard, video and mouse (KVM) files 604-3, Web Services-Management (WSMAN) files 604-4, Web User Interface (WebUI) files 604-5, Systems Management Architecture for Server Hardware (SMASH) files 604-6, and many other feature packages. In one embodiment, the files 604-I, I=1, 2, . . . , N, are Extensible Markup Language (XML) based software modules that each identify and describe a specific component which may be monitored and/or controlled by the BMC 501. In another embodiment, the SPX feature package library 610 includes at least one component file 604 for any and all components in the industry that may be incorporated onto a baseboard. Alternatively, the SPX feature package library 610 may only include a component file 604 corresponding to only a subset of components known in the industry.

In one embodiment, each DDF 604 in the DDF library 610 includes identification information that defines the classification of the component as well as the type of information that the component associated with that DDF 604 will provide. For example, the DDF 604 for a temperature sensor includes a definition (referred to herein as 'type tag") that the component is of the class "sensor" and of the type "temperature." The following excerpt of source code from the DDF 604 illustrates an exemplary definition for this identification information:

```
<Class>Sensor</Class>
<Type>Temperature</Type>
```

In another embodiment, the DDFs 604 include at least one routine executable by the BMC 501 to receive information from or control operation of the component corresponding to the DDF 604. For example, a DDF 604 corresponding to a temperature sensor may include a routine directing the BMC 501 to send a command to the sensor requesting a reading representing the current temperature sensed by the sensor, and upon reception of the reading, to move the reading to a specific register for subsequent analysis. The following excerpt of source code from the DDF 604 labeled Code Listing 1 illustrates an exemplary executable routine for implementation by the BMC 501:

```
<read>
mov           r1, 2
oemcmd
orb           r1,$(MONITOR_ON_STANDBY)
cmpeqb        p2, r1,1
```

The configuration GUI 400 is displayed on the web browser 106 can provide to the user a graphical user interface 700 (GUI) for selecting DDFs 604 associated with components included in the configuration specified for the baseboard. The user can specify the configuration for a baseboard through the user interface, which in turn sends the specifications to the firmware generator 110.

As the DDFs 604 are selected by the user through the user interface, the web browser 106 transmits the user's selections and the specifications to the web server 112. The web server 112 then sends the selections and specifications to the configuration execution module 114. The configuration execution module 114 retrieves the selected DDFs from the firmware configuration library 116 and compiles the selected DDFs 604 in a configuration file 606 that will ultimately be loaded into the firmware 608 of the BMC 501. An exemplary representation of a GUI 700 rendered by the configuration GUI 700 displayed on the web browser 106 is shown in FIGS. 7A-7D. As such, reference is made to these figures while describing operation of the configuration GUI 700 and the process for customizing the BMC firmware 608.

The GUI 700 presented to the user includes, among other features, a repository 702 and a design page 706. The design page 706 has representations 704 of the baseboard components and provides users with a virtual sketchpad for creating a model 608 representing the actual or intended configuration specified for the baseboard. The representation 702 includes components associated with each DDF 604 included in the DDF library 610.

Figure 7A:
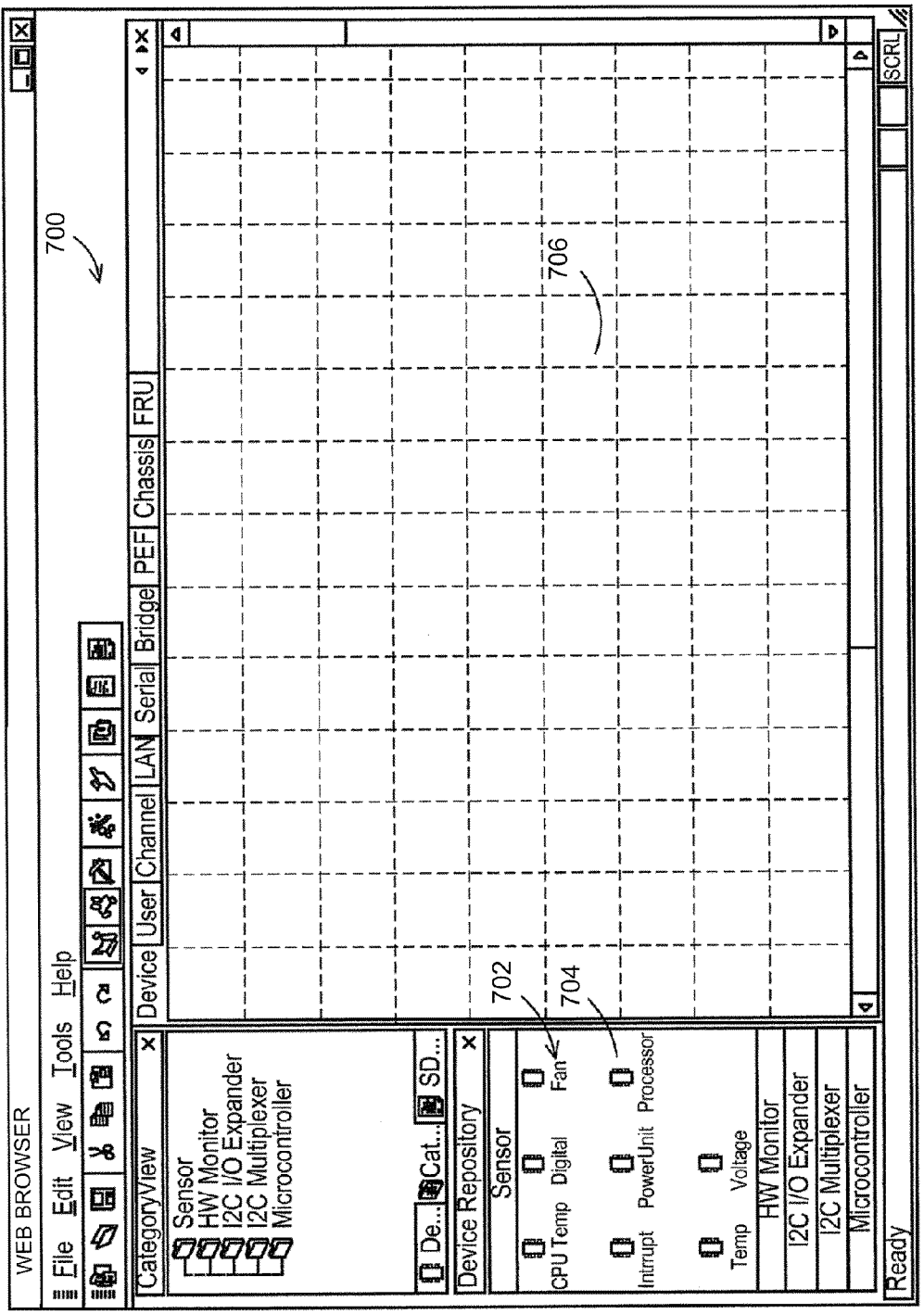
FIGS. 7A-7D are exemplary user interfaces of the network based firmware generator for firmware feature configuration and firmware image generation according to certain embodiments of the present disclosure.
Figure 7B:
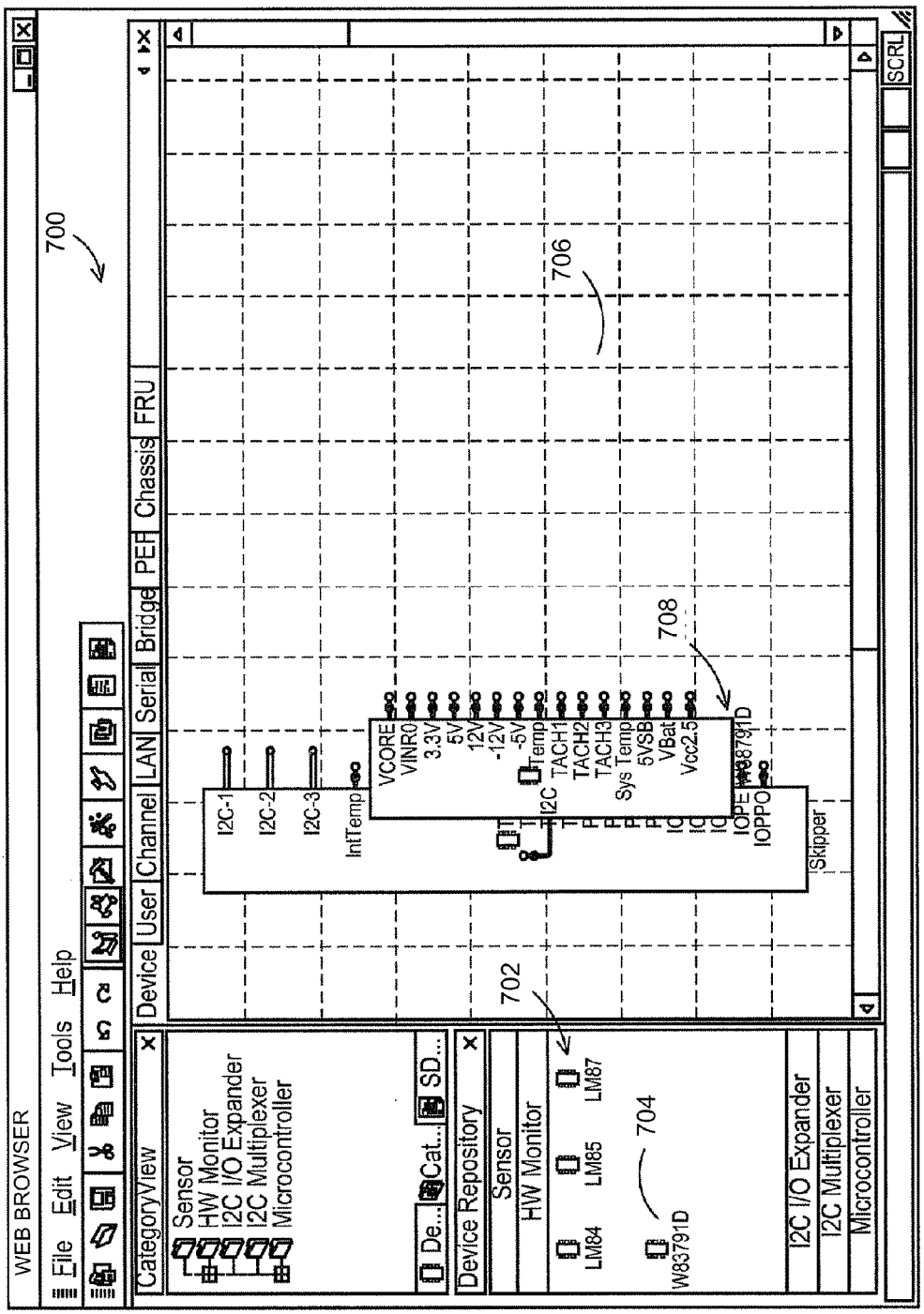

Initially, a user starts at the user interface displayed at the web browser 106 to create source code for a configuration file 606 representing the components of an actual or intended baseboard configuration that are to communicatively connect to the BMC 501. As shown in FIG. 7A, the initial design page 706 is blank and void of any component icons 704. In order to build the source code for this configuration file 606, the user of the configuration execution module 114 first drags and drops selected icons 704 from the repository 702 onto the design page 706. Each of the icons 704 are selected by the user based on whether or not the configuration specifies that the component associated with the icons 704 are\will be communicatively connected to the BMC for purposes of either monitoring or control, or both. Therefore, the user at least drags and drops an icon for a BMC as well as one or more icons representing sensor devices (e.g., 502, 506) in accordance with embodiments of the present disclosure. FIG. 7B shows the end-result of dragging two icons onto the design page 706.

As each icon is selected by the user implementing this drag-n-drop process, the user interface creates a specification that specifies the component corresponding to that icon is added to the design page 706. As will be described below, the web browser 106 transmits the specification to the firmware generator 110. The firmware generator 110 retrieves the DDFs specified in this specification and generates a configuration file. As such, the source code of the configuration file 606 is ultimately created with the DDFs 604 corresponding to those components that are specified as communicatively connected to the BMC by the configuration.

Figure 7C:
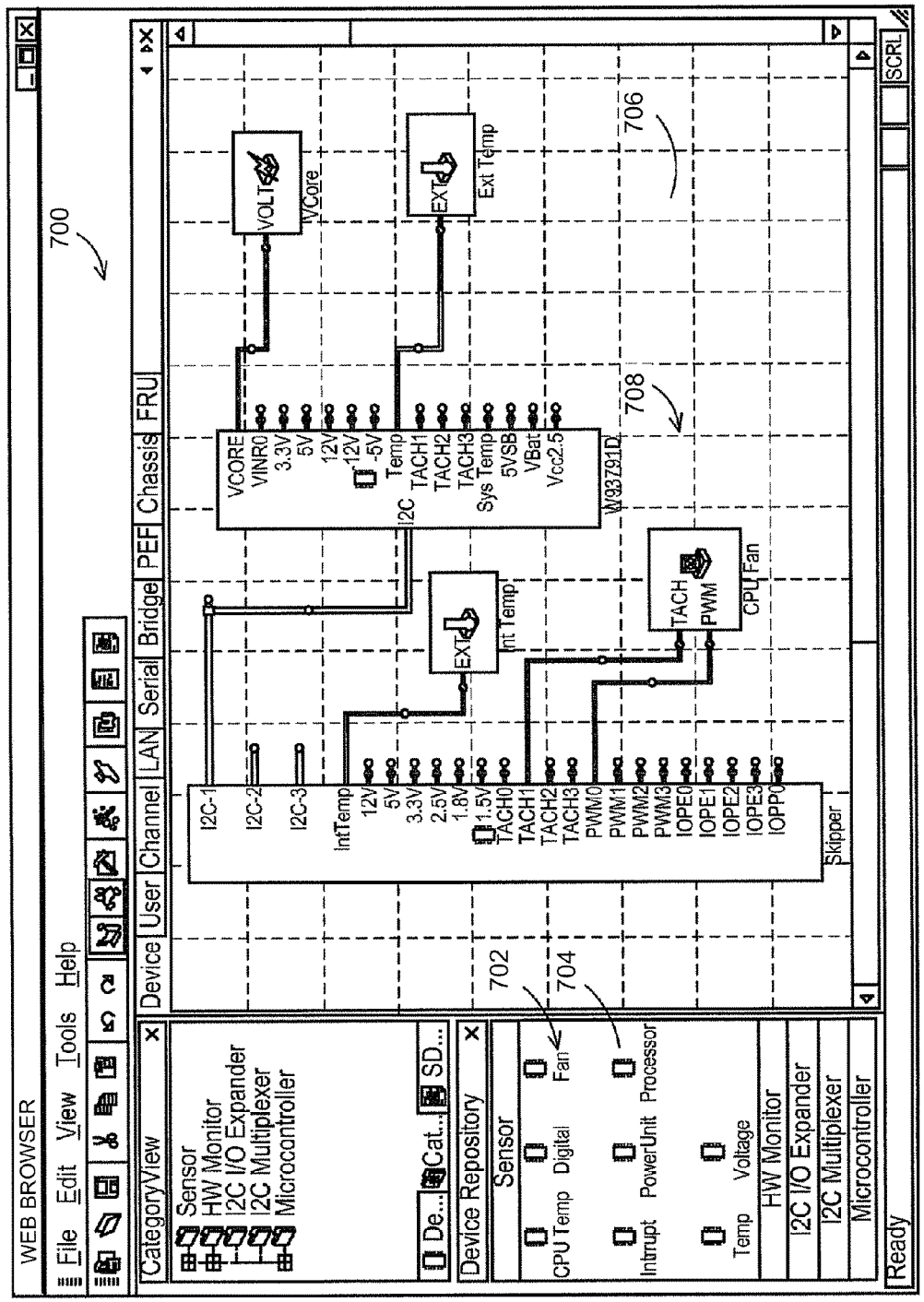

Also, the GUI 700 enables users to set up connections between two or more components. Because all components on a baseboard connect to each other by contact pins, the overall layout of connections between components is referred to herein as the "pin arrangement" for the. For instance, FIG. 7C shows six components making up a configuration being modeled on the design page 706 as well as the connections between these six components. The model 608 provides the user with a visual representation of each component that he/she has selected based on this specific configuration specified for the baseboard. The source code of the configuration file 606 is also updated to reflect the connections between these selected components.

As the networked server side, the configuration execution module 114 may also include an error-checking program module (not shown) used to validate the pin arrangement of the specification generated through the design page 706. After the user has finished creating the model 608 through the web browser 106 and the firmware generator 110, he/she can save the current design, thereby saving the source code for the configuration file 606 such that the code includes a DDF 604 corresponding to each selected component.

Figure 7D:
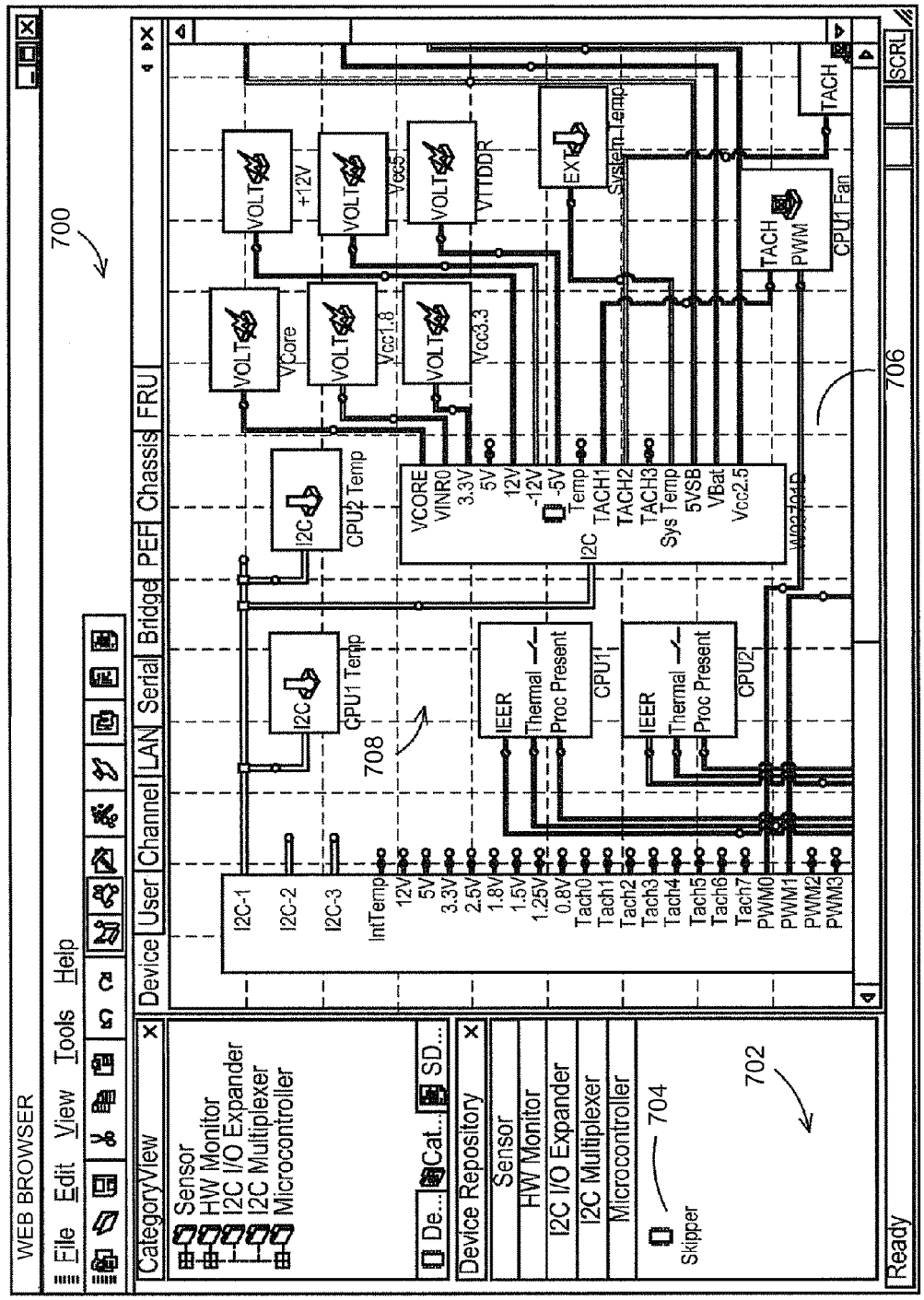

The user interface displays a visual representation of a completed configuration of a model 608 on the GUI 700 in FIG. 7D in accordance with certain embodiments of the present disclosure. Accordingly, as will be described below, the firmware generator 110 generates a configuration file for this design. The source code of the configuration file 606 is then compiled at the firmware generator 110, and the resulting binary file is incorporated into the BMC firmware 608, as shown in FIG. 7D.

The above-described process illustrates the use of a configuration execution module 114 to customize BMC firmware 608 based on a specific baseboard configuration. Operation of the configuration execution module 114 is dependent on the timely performance of logical operations implemented on a computer system. As such, one of skill in the art will appreciate that these logical operations may be stored on any type of computer readable medium, which may also be referred to as a "computer program product." Exemplary forms of computer readable media include computer storage media and communications media. Computer storage media includes volatile and nonvolatile, removable and non-removable media implemented in any method or technology for storage of information such as computer readable instructions, data structures, program modules or other data. As such, exemplary forms of computer storage media includes, without limitation, read only and random access memory (ROM and RAM, respectively), solid state, non-volatile memory, EEPROM, flash memory or other memory technology, magnetic tape, magnetic cassettes, magnetic disk storage, magnetic disc media or other magnetic storage devices, DVD or other optical storage, and CD-ROM. Communications media includes a modulated data signal, such as, but not limited to, a carrier wave or other transport mechanism, propagating on a carrier. A modulated data signal refers to a signal that encodes information. Exemplary forms of a carrier for communications media include, without limitation, any type of wired network and/or wireless media, such as acoustic, radio frequency, infrared and other wireless media.

It will be appreciated that the acts and symbolically represented operations include the manipulations by a CPU of electrical signals representing data bits causing a transformation or reduction of the electrical signal representation, and the maintenance of data bits at memory locations in memory, solid state, non-volatile memory, CD-ROM or any other type of storage unit (e.g., disc drive, tape drive, etc.) to thereby reconfigure or otherwise alter the operation of the computing system implementing the configuration execution module 114, as well as other processing signals. As such, performance of these operations is referred to as being "computer executed." The memory locations where data bits are maintained are physical locations that have particular electrical, magnetic, or optical properties corresponding to the data bits.

Logical operations of embodiments of the firmware generator 110 are implemented (1) as a sequence of computer-implemented steps running on a networked computing system or in a cloud and accessible remotely through a client program such as a web browser 106, and/or (2) as interconnected machine modules within the computing system. The implementation is a matter of choice dependent on the performance requirements of the computing system implementing the disclosure. Accordingly, the logical operations making up the embodiments of the present disclosure described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present disclosure as recited within the claims attached hereto. In accordance with one embodiment and referring back to FIG. 1, shown therein is a firmware generator 110 running in a cloud that implements such logical operations of this embodiment of the present disclosure.

It should be appreciated that other firmware features as listed above can also be selected and incorporated into an SPX Project to build a model 608 in the similar manner, and these processes will not be repeated here.

Figure 8:
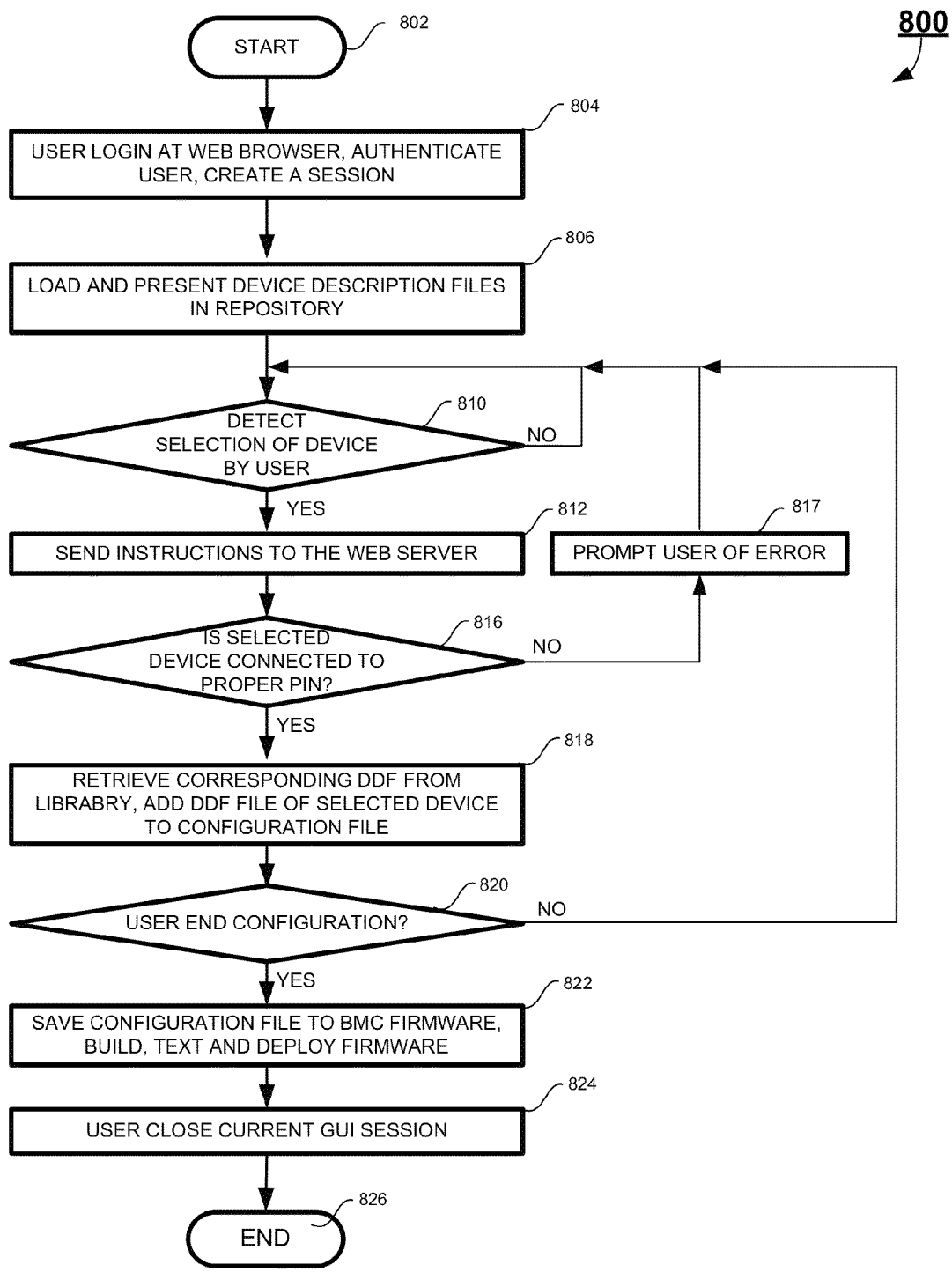
FIG. 8 is a flow diagram that illustrates an operation process of firmware generator according to one embodiment of the present disclosure.

With the computing environment in mind, FIG. 8 shows a flow chart of a customization process 800 for customizing ("customization process") BMC firmware 608 for operability with a configuration specified for a baseboard in accordance with an embodiment of the present disclosure. The customization process 800 is performed in one embodiment as a user interacts with a GUI which in turn in communication with the firmware generator. It should be appreciated, however, that the customization process 800 may instead be performed by a software application program executing on a remote computer and designed to interact with the firmware generator 110 with minimal or no manual interaction.

As shown and described FIG. 8, customizing the BMC firmware 608 based on a specific configuration involves defining a configuration file 606 for subsequent compilation and incorporation into the BMC firmware 608. As such, the customization process 800 is illustrated in FIG. 8 as being used to initially create the source code of this configuration file 606 through a user's selection of specific DDFs 604 corresponding to components that will be communicatively connected to the BMC during implementation of the configuration on the baseboard. However, one skilled in the art will also appreciate that one or more of the operations of the customization process 800 may also be used to update or revise previously created configuration files 606 that may or may not have already been incorporated into the BMC firmware 608.

The customization process 800 is performed, in whole or in part, by a flow of operations ("operation flow") beginning with a start operation 802 and concluding with a terminate operation 826. After the start operation 802, a user logs in to the network based firmware generator 110, at operation 804, from a web browser 106 by connecting to the web server 112 of the network based firmware generator 110 being used to customize the model 608. From the start operation 802, the operation flow passes to load device description files (DDF) to build repository operation 804.

The build repository operation 804 creates and renders on the GUI 700 a GUI component referred to herein and described above as a "repository 702," which includes an icon 704 for each component corresponding to a DDF 604 included in the DDF library 610. In one embodiment, the repository 702 is initially a GUI template void of any icons, and the build repository operation 804 fills the template with icons based on textual and appearance characteristics specified within each DDF 604 included in the DDF library 610.

After the build repository operation 804 has finished creating the repository 702, the operation flow passes to a present operation 806. All users are registered with the web server of the configuration execution module 114, and their credentials are stored at a predetermined network address. The user is presented with a login screen where the user can enter the username and password. Once the user enters the username and password, and the web server 112 authenticated the user, a new HTTP session is created at the web server 112 for this connection and the user will communicate with the web server 112 securely until the user choose to exit the firmware configuration tool and end the current HTTP session. If a second user accesses the same web server at the same time, another new HTTP session between the second user and the web server will be created. These sessions are separate and independent with each other. The web server of the network based firmware generator 110 is equipped with sufficient capacity of handling a large amount of these HTTP requests at the same time.

After user login, at operation 806, the configuration GUI 700 is displayed by 700, including the configuration web page rendered the web browser 109. The web browser 109 receives the configuration web page from the web server 112 of the firmware generator 110. The web server 112 creates and renders on the GUI 700 a GUI component referred to herein and described above as a "repository 702" which includes an icon 704 for each component corresponding to a DDF 604 included in the DDF library 610. In an embodiment, the repository 702 is initially a GUI template void of any icons, and the build repository operation 704 fills the template with icons based on textual and appearance characteristics specified within each DDF 304 included in the DDF library 610.

The GUI 700 enables users to input commands to specify a configuration of the firmware, and in response to these commands, visualize a model 608 representing a graphical creation of the specific configuration file 606 for the baseboard. The input device that the user interacts with to enter these commands may be any type of input device (e.g., keyboard, mouse, joystick, etc.) used with conventional GUIs or web browsers, as is known to those skilled in the art.

The operation flow passes to a first query operation 810. The first query operation 810 executed by the web browser 106 awaits a command from the user input device, and in response to receiving such a command, determines whether the user has selected a component for inclusion on the design page 706. In one embodiment, the user selects a component by "dragging" and "dropping" onto the design page 706 the icon corresponding to the component being selected. If a component has not been selected, the operation flow loops back to the first query operation 810 and awaits reception of another command, at which time the first query operation 810 performs as described below.

If the first query operation 810 determines that a component has been selected, the web browser 109 encodes this action, the information of the component selected, the location of the selected component dropped on the design page 706, and passes the encoded information (i.e., a configuration specification) to the web server 112, as shown in the operation 812.

At the web browser 106, the operation flow passes to a second query operation 817. In accordance with an embodiment of the present disclosure, the GUI 400 in conjunction with the firmware generator 110 enable users to not only select those components that are or will be communicatively connected to the BMC based on the configuration specified for a particular baseboard, but to also define which components will be connected, either directly or indirectly (via, for instance, the management bus and/or a sensor aggregation component 502), to which contact pins 604 of the BMC 501. In other words, the GUI 700 also provides the user with the ability to define the pin arrangement for the configuration file 606 as well as pin arrangement of the model 608.

As known to those skilled in the art, each contact pin 504 of a BMC 501 is operable to receive only certain type(s) of information, and only devices that sense, measure or transmit the information type(s) corresponding to a pin 504 may be connected either directly or indirectly to that pin 504. Referring back to the example described above, one of the pins 504 on the BMC may be of the "temperature" type, and thus, only sensor devices operable to provide a temperature reading may be connected to that pin 504. To that end, the present disclosure also encompasses a computer-implemented method for verifying that the pin arrangement of the model 608 on the design page 706 is valid, i.e., that each pin 504 of the BMC is connected to the appropriate type of component.

In certain embodiments, the customization process 800 includes a validation query operation 816 at the firmware generator 110 for validating pin arrangement of the configuration file 606 being created, and thus the pin arrangement of the configuration model 608 being displayed on the design page 706 of the GUI 700. The term "validating" is used herein to mean a process by which the graphically represented connection of a component to a BMC is checked to determine whether the connection is a proper connection with respect to the type associated with the input pin to which the component is connected. Further, it is intended the terms "connection" and "connected" refer to the establishment of an electrical communication path between two components either directly or indirectly through one or more other components.

The validation query operation 816 is shown as an operation if the customization process 800 determines that a component has indeed been selected. As such, the validation query operation 816 validates the connection of a component to a BMC pin 504 after the user makes such a connection on the design page 706. That configuration made by the user is transmitted to the firmware generator 110 for validation. It should be appreciated that the validation query operation 816 may instead be performed after multiple components have been connected to the BMC on the design page 706. The implementation is a matter of choice, and indeed, the validation query operation 816 may even be performed in response only to a user's request, which, in some instances, may take place after the configuration being modeled is completed on the design page 706.

As noted above, the validation query operation 816 is shown in accordance with an embodiment wherein the validation query operation 816 is performed in response to the "YES" branch of the customization process 800 being selected by the first query operation 810.

As such, the validation query operation 816 validates connection of a component to a BMC pin after the user makes such a connection on the design page 706. However, it should be appreciated that the validation query operation 816 may instead be performed after multiple components have been connected to the BMC on the design page 706. The implementation is a matter of choice, and indeed, the validation query operation 816 may even be performed in response only to a user's request, which, in some instances, may take place after the configuration being modeled is completed on the design page 706.

The validation query operation 816 compares the selected component type to the type specified by the pin 504 to which the component is connected in order to determine whether the component is the proper type of component for connection to that pin 504. In one embodiment, the validation query operation 816 makes such a determination by comparing a type tag specified within the DDF 604 corresponding to the selected component with a type tag associated with the pin 504, as specified in the DDF 604 for the BMC. If the type tags match, then the connection of the component to the pin 504 is proper, and the validation query operation 816 passes the operation flow back to the add operation 818. Otherwise, if the type tags do not match, the validation query operation 816 determines that the selected device is not connected to proper pins, the operation flow to alert operation 817 to alert the user of error, and then loops back to the first query operation 810 and awaits reception of another command to allow the user to make corrections. The alert operation 817 at the firmware generator 110 can transmit to the GUI 700 an error message that puts the user on notice that the proposed connection of the selected component to the pin of the BMC is improper.

From the alert operation 817, the operation flow is passed to the operation flow of the customization process 800 to the first query operation 810 which initially started the validation process.

The add operation 818 at the configuration execution module 114 performs multiple functions. The add operation 818, (a) retrieves corresponding DDF 604 from the firmware configuration library 116, (b) adds the DDF 604 of the selected component to the source code of the configuration file 606 being created, (c) instruct the GUI 400, through the web server 112, to place the icon of the selected component on the design page 706, and (d) instruct the GUI 400, through the web server 112, to provide a visual confirmation to the user that the DDF 604 has indeed been added to source code of the configuration file 606.

After the add operation 818 has completed these functions, the operation flow passes to a third query operation 820. The third query operation 820 at the web browser 106 awaits the next command input by the user, and in response to receipt of this command, determines whether the user has determined to exit the customization process 800. However, unlike the first query operation 810, the third query operation 820 references this determination against a point in time when the user requests termination of the configuration execution module 114. That is, if the user exits the configuration execution module 114, thereby closing the GUI 700, prior to selecting any other components from the repository 702, then the third query operation 820 branches the operation flow "YES" to a save operation 822. Otherwise, the third query operation 820 branches the operation flow "NO" back to the first query operation 810, which performs the functions noted above. This indicates that the user wishes to continue the firmware customization process 800. The operation flow then continues as previously described.

The save operation 822 saves the source code of the configuration file 606 to either permanent or temporary storage. The save operation 822 also compiles the source code of the configuration file 606 and loads the resulting binary file into an appropriate location within the model 608, which in an embodiment, has been previously loaded onto the BMC 501. Following the save operation 822, the operation flows to the closing operation 824. At the closing operation 824, the web server closes the graphical user interface of the current HTTP session with the user.

Following the closing operation 824, the operation flow concludes at the terminate operation 826. The customization process 800 is described as for one user only. Many other similar HTTP sessions can be created for many other users at the same time.

Figure 9:
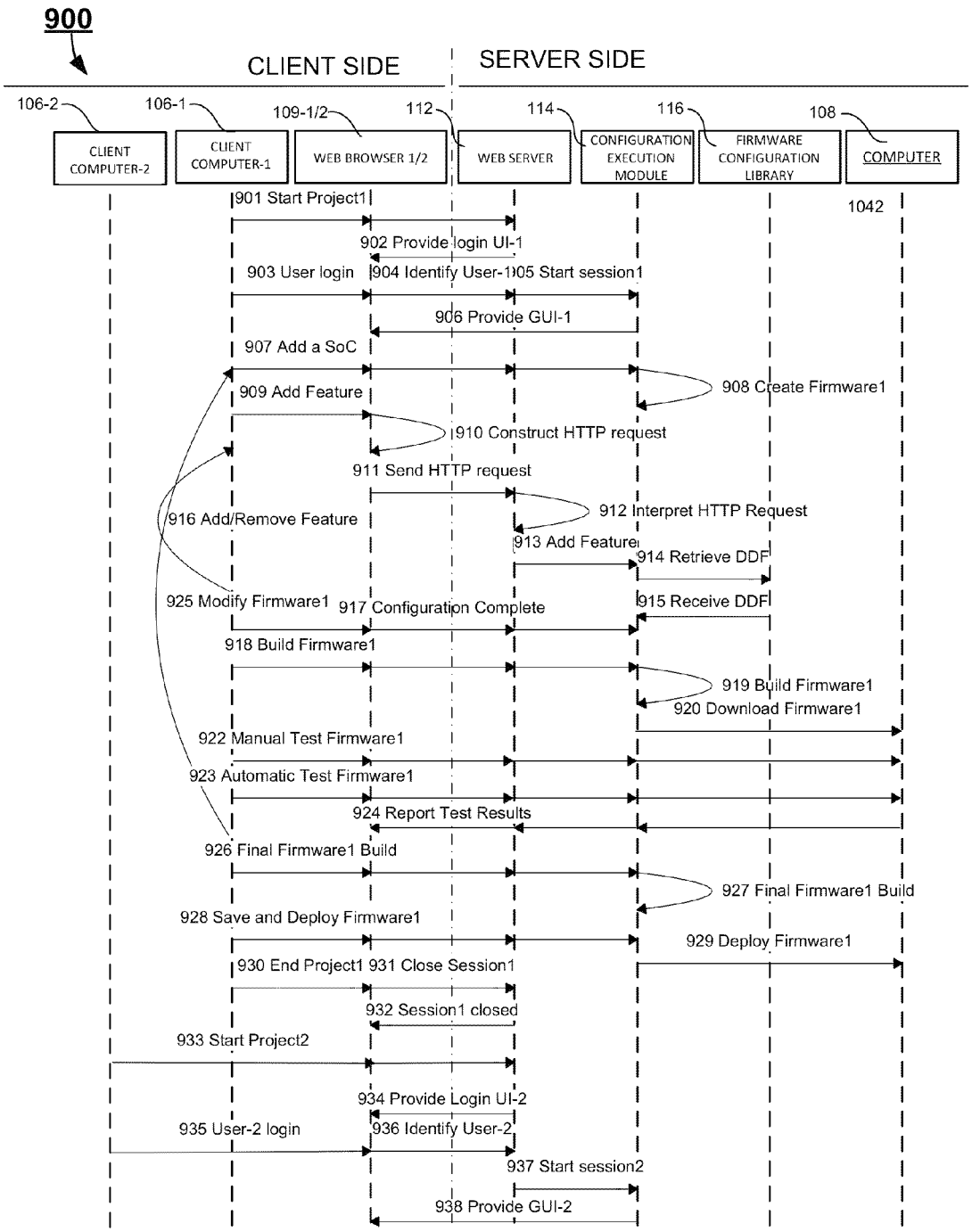
FIG. 9 is a sequence diagram illustrates an operation process of firmware generator according to one embodiment of the present disclosure.

Referring now to FIG. 9, a sequence diagram of the operation of configuration execution module 114 during a firmware configuration/customization process 900 is shown according to embodiments of the present disclosure. The configuration/customization process 900 involves a first client computer system 106-1, a second client computer system 106-2, a first User interface shown on the web browser 109-1 of the client computer 106-1, a second User interface shown on the web browser 109-2 of the client computer 106-2, on the client side, a web server 112, a configuration execution module 114, a code configuration library 116 on the web server 112 side, and a destination computer 108 where a firmware 608 is configured, debugged, tested, and deployed.

At the operation 901, the first user through client computer 106-1 starts a firmware configuration Project1 (or maybe name differently for clarity). The first user uses the web browser 109-1 executed on the first computer 106-1 to accesses the firmware generator 110 by connecting to the web server 112. The web browser 109-1 passed an HTTP request to the web server 112.

At the operation 902, the web server 112 provides a login user interface to the first user at the web browser 109-1.

At the operation 903, the first user enters the username and password of a registered user and log in.

At the operation 904, the web browser 109-1 sends the information entered by the first user to web server 112.

If the first user is an authorized user verified by the web server 112, the web server 112 starts a new configuration session at the configuration execution module 114 at the operation 905. At the operation 906, the configuration execution module 114 provides the web browser 109-1 with a configuration graphical user interface GUI-1 through the web server 112.

Starting at the operation 907, the firmware configuration process starts by selecting a system on a chip (SoC), or a baseboard management controller (BMC). As described earlier, this operation 907 is accomplished by the first user drags a baseboard management controller component from the repository 702 and drops them into a design page 706. This action is passed to the configuration execution module 114, and the configuration execution module 114, at operation 908, creates Firmware1 in response.

At the operation 909, the first user adds feature to the Firmware1 by dragging certain components from the repository 702, and dropping them into the design page 706 at the web browser 109-1.

Then at the operation 910, the web browser 109-1 translate the operation 909 into an HTTP request, and send the HTTP request to the web server 112 at the operation 911.

At the operation 912, the web server 112 interprets the operation 909 as add feature to the Firmware1.

At the operation 913, the web server 112 informs the configuration execution module 114 that certain features are added to the Firmware1 by the first user, and these features are passed to the configuration execution module 114. The added features include the number and model of sensors 506 and sensor aggregators 502, and how each of these sensors 506 and sensor aggregators 502 are physically connected to BMC or connected with each other. Other feature packages such as IPMI, WebUI, KVM, WSMAN, and SMASH can also be included in the Firmware1.

At the operation 914, the configuration execution module 114 retrieves DDF of corresponding components added from the code configuration library 116, and the configuration execution module 114 received these DDF from the code configuration library 116 at the operation 915.

At this time, the configuration execution module 114 will check the BMC and selected components against a set of predetermined rules to see if their connections are proper. If some of the connections are not proper, a warning message is sent to the first user at the web browser 109-1 for each improper connection to prompt the first user to make modifications and correct the improper connections. The operation 916 allows the first user to add, remove features incorporated in the Firmware1, and the operation 917 allows the first user to modify the features incorporated in the Firmware1.

At the operation 918, the first user has no errors in the configuration of the Firmware1, and completes the configuration. The first user send commands to the configuration execution module 114 to request the configuration execution module 114 to compile and build the Firmware1, through the web browser 109-1 and the web server 112, at the operation 919.

Once the configuration execution module 114 receives the request, the configuration execution module 114 compile and build the Firmware1 according to the current configuration at the operation 920.

At the operation 921, the Firmware1 built may be downloaded to a destination computer 108.

Once the Firmware1 is downloaded and installed on the destination computer 108, the first user can test the Firmware1 manually at the operations 922, or automatically at the operation 923. Many features such as WebUI, and IPMI can be tested automatically. The test results are reported back to the web browser 1 109-1 at the operation 924.

If the test uncovers any problems, the process 900 goes back at the operation 925 to modify the Firmware1 to operation 907. Otherwise, if there is no problem with the build, the first user can finalized the Firmware1 at the operation 926, and inform the configuration execution module 114 to finalize the configuration and make a final build for Firmware1 through the web browser 109-1 and the web server 112.

At the operation 927, the configuration execution module 114 compile and build the final version of Firmware1. Once the Firmware1 build is finalized, and built, the first user can save the firmware configuration and final build of Firmware1 to the configuration execution module 114 for future reference or reuse by similar configurations as indicated in operation 928. The Firmware1 can also be deployed to the destination computer 108 at the operation 929.

If the first user decides to end the firmware configuration project, the first user can select an exit command of the configuration execution module 114 at the operation 930 at the web browser 109-1, and the command is passed to the configuration execution module 114 through the web server 112 to close the first session for the first user at the operation 931. The configuration execution module 114 closed the first session for the first user at the operation 932.

If a second user wants to use the configuration execution module 114, the second user can uses the same approach to utilize the configuration execution module 114.

At the operation 933, the second user through client computer 106-2 starts a firmware configuration Project2. The second user uses the second computer 106-2 and accesses the configuration execution module 114 by connecting the second web browser 109-2 to the web server 112. The second web browser 109-2 sends an HTTP request to the web server 112.

At the operation 934, the web server 112 provides a login user interface to the first user at the second web browser 109-2. At the operation 935, the second user enters the username and password of another registered user and log in. At the operation 936, the second web browser 109-2 sends the information entered by the second user to web server 112. If the second user is an authorized user verified by the web server 112, the web server 112 starts a new configuration session at the configuration execution module 114 at the operation 937. At the operation 938, the configuration execution module 114 provides the second web browser 109-2 with a configuration graphical user interface GUI-2 through the web server 112.

The configuration process between the operations 907 and 932 can be utilized by the second user, and will not be repeated here for brevity.

It will be clear that the present disclosure is well adapted to attain the ends and advantages mentioned, as well as those inherent therein. While a presently preferred embodiment has been described for purposes of this disclosure, various changes and modifications may be made which are well within the scope of the present disclosure. For example, the firmware of the present disclosure is described in accordance with an embodiment as the BMC, which encompasses both hardware and firmware features. However, the firmware may be readily replaced by any other component, either hardware or software based, or a combination of both, which is operable for monitoring and/or controlling various components of a computer system. Furthermore, components that connect to the management bus 530 may connect either by connecting directly to the baseboard, i.e., soldered or affixed, or by connecting indirectly to the baseboard, such as by way of a jumper cable to a contact pin for the management bus 530, wherein the contact pin is directly affixed to the baseboard. Numerous other changes and alternatives may be made which will readily suggest themselves to those skilled in the art and which are encompassed in the spirit of the disclosure disclosed and as defined in the appended claims.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A computer-implemented method for modeling a configuration of components connected to a baseboard of a computer system, the method comprising:
   providing a network based firmware generator in a network connecting a plurality of computing devices, wherein the computing devices comprise a remote computing device and a baseboard management controller (BMC) such that the network based firmware generator is accessible by the remote computing device;
   defining a plurality of device description files at the network based firmware generator, each device description file describing a component in a set of components which is selectively included in the configuration, wherein each device description file specifies the identification information associated with the component to which the device description file is associated;
   receiving, at a web server of the firmware generator, a login request for a user from the remote computing device through the network;
   in response to the login request, authenticating the user at the web server, and sending, from the web server to the remote computing device via a network, a graphical user interface, wherein the graphical user interface, when received and executed at the at least one remote computing device, is configured to
      allow the authenticated user to perform a selection of one or more of the components to be included in a firmware configuration file; and
      in response to the selection, construct a first request having information of the one or more components being selected, and send the first request to the web server of the firmware generator;
   receiving, at the web server of the firmware generator, the first request from the graphical user interface sent to and executed at the remote computing device; and
   in response to the first request, constructing a firmware image for the BMC at the firmware generator.

2. The computer-implemented method of claim 1, wherein the network comprises at least one of Internet, an intranet, a Wi-Fi network, an enterprise network, a local area network, a wide area network, a telecommunication network, and a mobile communication network.

3. The computer-implemented method of claim 1, wherein the firmware image for the BMC is constructed by:
   copying a device description file of each of the one or more selected components to the firmware configuration file, the device description file specifying identification information associated with the each component in accordance with the first request;

validating the firmware configuration file according to a set of predetermined rules;

sending, at the web server, a response to the graphical user interface, the response indicating whether the selection is valid; and displaying the response on the graphical user interface.

4. The computer-implemented method of claim 3, further comprising:

debugging the firmware configuration file at the firmware generator.

5. The computer-implemented method of claim 1, wherein the graphical user interface is a web page rendered by a web browser, wherein the method comprises:

rendering on the web page a first portion comprising a plurality of graphical icons, wherein each of the plurality of graphical icons represents a component in a set of components which may be included in the configuration;

rendering on the web page a second portion for creating a model of the configuration of the baseboard using the plurality of graphical icons included in the first portion;

generating, at the web browser, a second request for selecting a first component, wherein the second request is formed by a user dragging a first graphical icon representing the first component from the first portion into the second portion; and sending the second request to the firmware generator and displaying the first graphical icon in the second portion.

6. The computer-implemented method of claim 5, further comprising:

receiving, at the web browser, a third request for connecting the first component to a particular contact pin of a second component, wherein a second graphical icon representing the second component is displayed on the second portion;

in response to the third request for connection of the first component to the particular contact pin of the second component, sending the third request from the web browser to the firmware generator;

analyzing, at the firmware generator, the requested connection of the first component to the particular contact pin of the second component and determining whether the first component is a component which may be appropriately connected to the particular contact pin;

displaying, at the web page, the first graphical icon as connected to the second graphical icon if the analyzing act determines that the connection of the second component to the particular contact pin is proper; and presenting an error message on the web browser if the analyzing act determines that the first component is not a component specified for proper connection to the particular contact pin.

7. The computer-implemented method of claim 1, wherein the first request is configured to instruct the firmware generator to at least one of:

create a customized firmware for a destination computer by selecting a system-on-a-chip and one or more components from a module code library of the firmware generator;

define a customized firmware;

add a feature to or remove a feature from the customized firmware;

build a firmware image by compiling and debugging module codes of selected features from a module code library;

test a customized firmware including manual and automatic testing;

automated firmware development; and deploy the firmware image to a destination computer.

8. The computer-implemented method of claim 7, wherein the module code library comprises at least one of source code and binary code.

9. The computer-implemented method of claim 7, wherein the feature is a function provided by the selected component and described in the corresponding device description file, a module code of each feature exists in the module code library of the firmware generator.

10. The computer-implemented method of claim 1, wherein each device description file comprises information for configuring a management module to control an associated component based on information received from an associated component.

11. The computer-implemented method of claim 10, wherein the management module comprises a software module operable for implementation on a computer system.

12. The computer-implemented method of claim 10, wherein the management module comprises the baseboard management controller (BMC) operable for being communicatively connected to the baseboard.

13. A system for configuring a firmware image of a service processor, the system comprising:

a network connecting a plurality of computing devices, wherein the computing devices comprises at least one client computer and the service processor;

a network based firmware generator executed on a processor of at least one of the plurality of computing devices connected to the network to be accessible by the at least one client computer, the firmware generator including a firmware configuration library, storing a plurality of Service Pack Extension (SPX) packages, each of the SPX packages to a specific SPX feature and including a firmware data module;

a web server configured to receive a login request for a user from the at least one client computer through the network:

in response to the login request, authenticate the user, and send a plurality of graphical user interfaces to the at least one client computer through the network, wherein each of the graphical user interfaces, when received and executed at the at least one client computer, is configured to allow the authenticated user to perform a selection to one or more of the SPX packages to be included in a SPX project; and in response to the selection, construct a first request having information of the one or more SPX packages being selected, and send the first request back to the web server through the network; and receive the first request from the graphical user interfaces sent to and executed at the at least one client computer; and a firmware builder configured to, in response to the first request, build the firmware image of the service processor by incorporating the selected SPX packages in the SPX project.

14. The system of claim 13, wherein the network comprises the Internet, an intranet, a Wi-Fi network, an enterprise network, a local area network, a wide area network, a telecommunication network, and a mobile communication network.

15. The system of claim 13, wherein the firmware data module comprises at least one of source code and binary code.

16. The system of claim 13, wherein the plurality of Service Pack Extension (SPX) packages includes at least one of: webserver, WAMAN, Security protocols, terminal server (SSH/telnet), Authentication types, Discovery tools, test tools, IPMI, CIM, PMCP Utility, SMASH, SVNSPX, WDP, virtual media, and media redirection.

17. The system of claim 13, wherein the graphical user interfaces are sent securely from the computing device to the client computer, wherein the graphical user interfaces are configured to:
    render on an SPX package space a plurality of graphical icons, wherein each of the plurality of graphical icons represents one of the plurality of SPX packages;
    receive a user instruction selecting a first SPX package to be included in the SPX project; and
    in response to the user instruction, display a graphical representation showing that the SPX project includes the first SPX package.

18. The system of claim 17, wherein the graphical user interfaces enable the user to select more than one package of the plurality of SPX packages.

19. The system of claim 17, wherein the graphical user interfaces enable the user to test the SPX project.

20. The system of claim 19, wherein the SPX project test comprises:
    manual test; and
    automatic test.

21. The system of claim 13, further comprising a debugger.

22. A non-transitory computer storage medium having computer-executable instructions stored thereon which, when executed by a processor of one of a plurality of computing devices in a network, cause the processor to:
    provide a network based firmware generator in the network connecting the plurality of computing devices, wherein the computing devices comprise a remote computer and a baseboard management controller (BMC) such that the network based firmware generator is accessible by the remote computer;
    define a plurality of device description files at the network based firmware generator, each device description file describing a component in a set of components which is selectively included in the configuration, wherein each device description file specifies the identification information associated with the component to which the device description file is associated;
    receive, at a web server of the firmware generator, a login request for a user from the remote computer through the network;
    in response to the login request, authenticate the user at the web server, and send a graphical user interface from the web server to the remote computer through the network, wherein the graphical user interface, when received and executed at the at least one remote computing device, is configured to
        allow the authenticated user to perform a selection of one or more of the components to be included in a firmware configuration file; and
        in response to the selection, construct a first request having information of the one or more components being selected, and send the first request to the web server of the firmware generator;
    receive, at the web server of the firmware generator, the first request from the graphical user interface sent to and executed at the remote computer; and
    in response to the first request, construct a firmware image for the BMC at the firmware generator.

23. The non-transitory computer storage medium of claim 22, wherein the network comprises at least one of the Internet, an intranet, a Wi-Fi network, an enterprise network, a local area network, a wide area network, a telecommunication network, and a mobile communication network.

24. The non-transitory computer storage medium of claim 22, wherein the computer-executable instructions, when executed, cause the processor to construct the firmware image for the BMC by:
    copying a device description file of each of the one or more selected components to the firmware configuration file, the device description file specifying identification information associated with the each component in accordance with the first request;
    validating the firmware configuration file according to a set of predetermined rules;
    sending, at the web server, a response to the graphical user interface, the response indicating whether the selection is valid; and
    displaying the response on the graphical user interface.

25. The non-transitory computer storage medium of claim 24, further comprising the computer-executable instructions for the processor to debug the firmware configuration file at the firmware generator.

* * * * *